United States Patent
Xu et al.

(10) Patent No.: US 11,228,535 B2
(45) Date of Patent: Jan. 18, 2022

(54) SYSTEMS AND METHODS FOR CONTROLLING NETWORK CONGESTION

(71) Applicant: ZHEJIANG DAHUA TECHNOLOGY CO., LTD., Zhejiang (CN)

(72) Inventors: Yangbo Xu, Hangzhou (CN); Wenjun Yuan, Hangzhou (CN); Guangfeng Xue, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 33 days.

(21) Appl. No.: 16/449,318

(22) Filed: Jun. 21, 2019

(65) Prior Publication Data

US 2019/0312817 A1    Oct. 10, 2019

Related U.S. Application Data

(63) Continuation of application No. PCT/CN2017/117437, filed on Dec. 20, 2017.

(51) Int. Cl.
*H04L 12/841* (2013.01)
*H04L 12/801* (2013.01)
*H04L 12/851* (2013.01)

(52) U.S. Cl.
CPC .......... *H04L 47/283* (2013.01); *H04L 47/127* (2013.01); *H04L 47/2433* (2013.01)

(58) Field of Classification Search
CPC .................................................... H04L 47/283
See application file for complete search history.

(56) References Cited

U.S. PATENT DOCUMENTS

| 6,606,643 B1 * | 8/2003 | Emens ............... H04L 29/06 709/200 |
| 7,088,677 B1 | 8/2006 | Burst, Jr. |

(Continued)

FOREIGN PATENT DOCUMENTS

| CN | 102231711 B | 11/2011 |
| CN | 102984077 B | 3/2013 |

(Continued)

OTHER PUBLICATIONS

Jaehwa Park et al., A Classification of Network Traffic Status for Various Scale Networks, Information Networking (ICOIN), 595-599, 2013.

(Continued)

*Primary Examiner* — John D Blanton
(74) *Attorney, Agent, or Firm* — Metis IP LLC

(57) ABSTRACT

A system and method for controlling network congestion are provided. The method may include one or more of the following operations. One or more alert signals corresponding to one or more alert events of one or more urgency levels may be obtained at a first time of interest. A network condition of the network at the first time of interest may be obtained. A congestion assessment (CGA) at the first time of interest may be performed based on the network condition. A first communication protocol for sending the one or more alert signals may be determined based on the CGA. A first batch of alert signals of the one or more alert signals may be caused, based on the first communication protocol and the urgency levels of the one or more alert signals, to be sent via the network.

20 Claims, 12 Drawing Sheets

(56) References Cited

U.S. PATENT DOCUMENTS

| | | | |
|---|---|---|---|
| 2008/0225848 A1* | 9/2008 | Pilon | H04M 11/062 370/390 |
| 2011/0002223 A1 | 1/2011 | Gross | |
| 2013/0279491 A1* | 10/2013 | Rubin | H04W 76/50 370/347 |
| 2014/0019638 A1 | 1/2014 | Kurabayashi et al. | |
| 2015/0350887 A1* | 12/2015 | Huai | H04W 4/90 455/404.1 |
| 2015/0359014 A1 | 12/2015 | Daly et al. | |
| 2016/0246695 A1* | 8/2016 | Heikinheimo | G06F 11/277 |
| 2016/0373510 A1 | 12/2016 | Sreevalsan et al. | |
| 2019/0312817 A1* | 10/2019 | Xu | H04L 47/127 |

FOREIGN PATENT DOCUMENTS

| | | |
|---|---|---|
| CN | 105721333 A | 6/2016 |
| CN | 106027297 A | 10/2016 |
| CN | 106027407 A | 10/2016 |
| WO | 2018113695 A1 | 6/2018 |

OTHER PUBLICATIONS

The Extended European Search Report in European Application No. 17882411.6 dated Oct. 11, 2019, 7 pages.
International Search Report in PCT/CN2017/117437 dated Feb. 24, 2018, 4 pages.
Written Opinion in PCT/CN2017/117437 dated Feb. 24, 2018, 5 pages.
First Office Action in Chinese Application No. 201611208665.7 dated Mar. 21, 2019, 10 pages.
Communication Pursuant to Article 94(3) EPC in European Application No. 17882411.6 dated Mar. 16, 2021, 6 pages.

* cited by examiner

200

800

```
┌─────────────────────────────────────────────────────────────┐
│ Performing a probability assessment of network congestion   │  810
│ at time of interest based on a round-trip time at the time  │
│ of interest, a shortest round-trip corresponding to time of │
│ interest, and an empirical value of network condition       │
│ corresponding to the time of interest                       │
└─────────────────────────────────────────────────────────────┘
                              │
                              ▼
┌─────────────────────────────────────────────────────────────┐
│ Determining a communication protocol based on the           │  820
│ probability assessment of network congestion                │
└─────────────────────────────────────────────────────────────┘
                              │
                              ▼
┌─────────────────────────────────────────────────────────────┐
│ Sending at least a portion of the one or more alert signals │  830
│ corresponding to one or more alert events via the network   │
│ based on the communication protocol                         │
└─────────────────────────────────────────────────────────────┘
```

FIG. 8

SYSTEMS AND METHODS FOR CONTROLLING NETWORK CONGESTION

CROSS-REFERENCE TO RELATED APPLICATIONS

This application is a continuation of International Application No. PCT/CN2017/117437, filed on Dec. 20, 2017, which claims priority of Chinese Application No. 201611208665.7, filed on Dec. 23, 2016, the entire contents of each of which are hereby incorporated by reference.

TECHNICAL FIELD

The present disclosure generally relates to communication technology, and more specifically, to methods and systems for controlling network congestion.

BACKGROUND

A security system, e.g., a video surveillance system has been widely used. Proper operation of video surveillance may depend on bandwidth stability. Bandwidth instability may affect monitoring quality. For example, mosaics, screen jumping, pauses, or the like, or a combination thereof may appear in a video feed from a video surveillance system. Meanwhile, video surveillance may also have a high demand for bandwidth. For example, in a certain time duration, if a large number of alert events need to be transmitted via an alert network, a bandwidth demand may exceed a bandwidth limit of the alert network. That may cause a congestion of the alert network and/or decrease the efficiency for transmitting the alert events via the alert network or even results in a deadlock.

Therefore, it is desirable to provide methods and systems to improve network efficiency and/or stability in order to reduce network congestion and/or achieve real time and accurate transmission of information including, e.g., alert events.

SUMMARY

In a first aspect of the present disclosure, a method for controlling network congestion may be implemented on at least one machine each of which has at least one processor, storage, and a communication platform connected to a network. The method may include one or more of the following operations. One or more alert signals corresponding to one or more alert events of one or more urgency levels may be obtained at a first time of interest. A network condition of the network at the first time of interest may be obtained. A congestion assessment (CGA) at the first time of interest may be performed based on the network condition. A first communication protocol for sending the one or more alert signals may be determined based on the CGA. A first batch of alert signals of the one or more alert signals may be caused, based on the first communication protocol and the urgency levels of the one or more alert signals, to be sent via the network.

In some embodiments, the network condition includes a round-trip time at the first time of interest, a shortest round-trip time of a first time duration that encompasses the first time of interest, and/or an empirical value of the network condition at the first time of interest.

In some embodiments, a second batch of alert signals of the one or more alert signals that have not been sent may be stored. In some embodiments, the second batch of the one or more alert signals may be caused to be sent via the network based on a second communication protocol that is determined based on a CGA performed at a second time of interest.

In some embodiments, the network condition of the network at the first time of interest may be obtained by determining whether the first time of interest corresponds to a cyclic pattern.

In some embodiments, in response to the determination that the first time of interest corresponds to the cyclic pattern, the empirical value of network condition at the first time of interest may be obtained.

In some embodiments, the empirical value of the network condition may include at least one average round-trip time of a second time duration encompassing the first time of interest. In some embodiments, the CGA at the first time of interest may be performed based on the network condition by determining the CGA based on the empirical value, the round-trip time at the first time of interest, and the shortest round-trip of the first time duration.

In some embodiments, in response to the determination that the first time of interest fails to correspond to the cyclic pattern, the empirical value of network condition at the first time of interest may be obtained. In some embodiments, the empirical value of network condition may include the at least one average round-trip time of a second time duration and an average round-trip time of a third time duration. One or both of the second time duration and the third time duration may encompass the first time of interest. In some embodiments, the CGA at the first time of interest may be performed based on the network condition by determining the CGA based on the empirical value, the round-trip time at the first time of interest, and the shortest round-trip time of the first time duration.

In some embodiments, the average round-trip time of the second time duration may be determined based on a daily average round-trip time, a weekly average round-trip time, a monthly average round-trip time, or a yearly average round-trip time.

In some embodiments, the cyclic pattern may include a predetermined time interval that includes a day, a week, a month, or a year.

In a second aspect of the present disclosure, a system for controlling network congestion may include at least one computer-readable storage medium which has a set of instructions and at least one processor in communication with the at least one computer-readable storage medium. When executing the instructions, the at least one processor may be directed to perform a method including one or more of the following operations. One or more alert signals corresponding to one or more alert events of one or more urgency levels may be obtained at a first time of interest. A network condition of the network at the first time of interest may be obtained. A congestion assessment (CGA) at the first time of interest may be performed based on the network condition. A first communication protocol for sending the one or more alert signals may be determined based on the CGA. A first batch of alert signals of the one or more alert signals may be caused to be sent via the network based on the first communication protocol and the urgency levels of the one or more alert signals.

In some embodiments, the network condition includes a round-trip time at the first time of interest, a shortest round-trip time of a first time duration that encompasses the first time of interest, and/or an empirical value of the network condition at the first time of interest.

In some embodiments, the at least one processor may be further directed to perform one or more of the following operations. A second batch of alert signals of the one or more alert signals that have not been sent may be stored. The second batch of the one or more alert signals may be caused to be sent via the network based on a second communication protocol that is determined based on a CGA performed at a second time of interest.

In some embodiments, to obtain the network condition of the network at the first time of interest, the at least one processor may be directed to perform the following operation. Whether the first time of interest corresponds to a cyclic pattern may be determined.

In some embodiments, to obtain the network condition of the network at the first time of interest, the at least one processor may be directed to perform one or more of the following operations. The first time of interest corresponds to the cyclic pattern may be determined. In response to a determination that the first time of interest corresponds to the cyclic pattern, the empirical value of network condition at the first time of interest may be obtained. The empirical value of the network condition may include at least one average round-trip time of a second time duration encompassing the first time of interest.

In some embodiments, to perform the CGA at the first time of interest based on the network condition, the at least one processor may be further directed to determine the CGA based on the empirical value, the round-trip time at the first time of interest, and the shortest round-trip of the first time duration.

In some embodiments, to obtain network condition of the network at the first time of interest, the at least one processor may be directed to perform a method including one or more of the following operations. The first time of interest fails to correspond to the cyclic pattern may be determined. In response to a determination that the first time of interest fails to correspond to the cyclic pattern, the empirical value of network condition at the first time of interest may be obtained. The empirical value of network condition may include the at least one average round-trip time of a second time duration and an average round-trip time of a third time duration, One or both of the second time duration and the third time duration may encompass the first time of interest.

In some embodiments, to perform the CGA at the first time of interest based on the network condition, the at least one processor may be directed to perform a method including one or more of the following operations. The CGA may be determined based on the empirical value, the round-trip time at the first time of interest, and the shortest round-trip time of the first time duration.

In some embodiments, the at least one processor may be further directed to perform the following operation. The average round-trip time of the second time duration may be determined based on a daily average round-trip time, a weekly average round-trip time, a monthly average round-trip time or a yearly average round-trip time.

In some embodiments, the cyclic pattern includes a predetermined time interval that includes a day, a week, a month, or a year.

In a third aspect of the present disclosure, a non-transitory computer-readable storage medium for controlling network congestion may store instructions that, when executed by at least one processor of a system, cause the system to perform a method including one or more of the following operations. One or more alert signals corresponding to one or more alert events of one or more urgency levels may be obtained at a first time of interest. A network condition of the network at the first time of interest may be obtained. A congestion assessment (CGA) at the first time of interest may be performed based on the network condition. A first communication protocol for sending the one or more alert signals may be determined based on the CGA. A first batch of alert signals of the one or more alert signals may be caused, based on the first communication protocol and the urgency levels of the one or more alert signals, to be sent via the network.

In a fourth aspect of the present disclosure, a system for controlling network congestion may include at least one processor and storage. The system may include a transmission module, a congestion assessment module, communication protocol determination module, and a transmission module. The transmission module may be directed to obtain, at a first time of interest, one or more alert signals corresponding to one or more alert events of one or more urgency levels. The congestion assessment module may be directed to obtain a network condition of the network at the first time of interest, and perform a congestion assessment (CGA) at the first time of interest based on the network condition. The communication protocol determination module may be directed to determine a first communication protocol for sending the one or more alert signals based on the CGA. The transmission module may be directed to send a first batch of alert signals of the one or more alert signals via the network based on the first communication protocol and the urgency levels of the one or more alert signals.

In some embodiments, the network condition includes a round-trip time at the first time of interest, a shortest round-trip time of a first time duration that encompasses the first time of interest, and/or an empirical value of the network condition at the first time of interest.

In some embodiments, the system may further include an alert signal storage module directed to store a second batch of alert signals of the one or more alert signals that have not been sent, and the transmission module may be further directed to send the second batch of the one or more alert signals via the network based on a second communication protocol that may be determined based on a CGA performed at a second time of interest.

In some embodiments, to obtain the network condition of the network at the first time of interest, the system may further include a cyclic pattern determination module directed to determine whether the first time of interest corresponds to a cyclic pattern.

In some embodiments, to obtain the network condition of the network at the first time of interest, the cyclic pattern determination module may be directed to determine that the first time of interest corresponds to the cyclic pattern; and in response to a determination that the first time of interest corresponds to the cyclic pattern, the congestion assessment module may be directed to obtain the empirical value of network condition at the first time of interest, the empirical value of the network condition including at least one average round-trip time of a second time duration encompassing the first time of interest.

In some embodiments, to perform the CGA at the first time of interest based on the network condition, the congestion assessment module may be directed to determine the CGA based on the empirical value, the round-trip time at the first time of interest, and the shortest round-trip of the first time duration.

In some embodiments, to obtain network condition of the network at the first time of interest, the cyclic pattern determination module may be directed to determine that the first time of interest fails to correspond to the cyclic pattern, and in response to a determination that the first time of interest fails to correspond to the cyclic pattern, the congestion assessment module may be directed to obtain the empirical value of network condition at the first time of interest, the empirical value of network condition including the at least one average round-trip time of the second time duration and an average round-trip time of a third time duration. One or both of the second time duration and the third time duration may encompass the first time of interest.

In some embodiments, to perform the CGA at the first time of interest based on the network condition, the congestion assessment module may be directed to determine the CGA based on the empirical value, the round-trip time at the first time of interest, and the shortest round-trip time of the first time duration.

In some embodiments, the congestion assessment module may be further directed to determine the average round-trip time of the second time duration based on a daily average round-trip time, a weekly average round-trip time, a monthly average round-trip time, or a yearly average round-trip time.

In some embodiments, the cyclic pattern includes a predetermined time interval that includes a day, a week, a month, or a year.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 8 is a flowchart illustrating an exemplary process for controlling network congestion according to some embodiments of the present disclosure;

DETAILED DESCRIPTION

Figure 1:
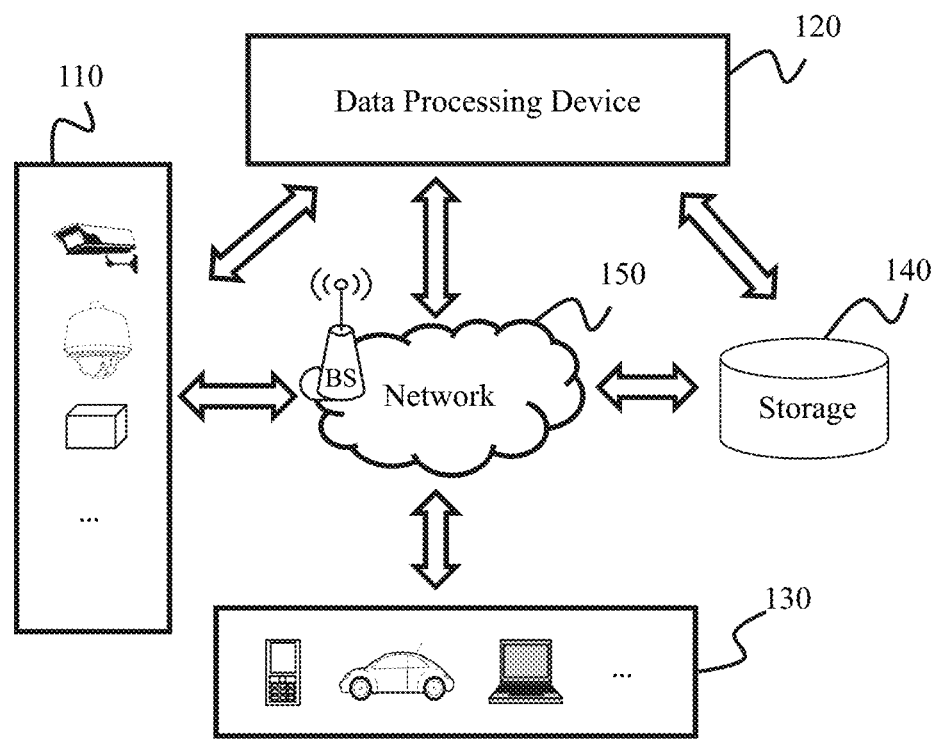
FIG. 1 is a schematic diagram illustrating an exemplary surveillance system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by another expression if they achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an erasable programmable read-only memory (EPROM). It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

The present disclosure relates to a communication system. Specially, the present disclosure relates to systems and methods for controlling network congestion. For example, if a large number of alert events need to be transmitted via a network in a short time period, the bandwidth and stability of the network may need to be improved. To this end, the systems and methods may assess the network and provide different communication protocols for the alert events to avoid network congestion.

FIG. 1 illustrates a schematic diagram of an exemplary surveillance system 100 according to some embodiments of the present disclosure. Surveillance system 100 may include a monitoring device 110, a data processing device 120, a terminal 130, storage 140, and a network 150.

Monitoring device 110 may be configured to monitor an area or a place (e.g., a road, a supermarket, a residential area, or a bank, etc.) to acquire data (e.g., imaging data, audio data, etc.), based on which an alert event may be identified. In some embodiments, monitoring device 110 may process the acquired data to identify the alert event. In some embodiments, monitoring device 110 may send the acquired data to data processing device 120 that may further process the acquired data to identify the alert event, detailed description of which may be found elsewhere in the present disclosure. See, e.g., FIGS. 4A and 4B and the description thereof. As used herein, an alert event may refer to any accident or event for which an alert has been designated to render. For example, when a road is monitored, exemplary alert events may include a speeding event, a traffic accident, a traffic congestion, or the like, or any combination thereof. Monitoring device 110 may include at least one sensor, which may monitor events relating to one or more objects (e.g., a vehicle, a passenger, etc.) that appears in the area or place monitored by monitoring device 110, to detect the alert event. Exemplary sensors may include a video sensor (e.g., a camera), an audio sensor (e.g., a microphone), a speed detector, or the like, or any combination thereof. Exemplary cameras may include a network camera, a fixed camera, a fixed dome camera, a covert camera, a Pan-Tilt-Zoom (PTZ) camera, a radar camera, and/or a thermal camera. Merely by way of example, monitoring device 110 may include a radar camera, which may monitor the speed of a vehicle to determine whether the vehicle exceeds an applicable speed limit. Upon the determination that the vehicle exceeds the applicable speed limit, a speeding event is deemed to be detected. In some embodiments, there may be a library of alert events against which monitoring device 110 may compare a detected event to determine whether the detected event is an alert event. The library may be stored in monitoring device 110 or retrieved by monitoring device 110 from another module or storage device. For a detected alert event, monitoring device 110 may render an alert signal accordingly.

When an alert event is detected, monitoring device 110 may transmit a corresponding alert signal to one or more components of the surveillance system 100 (e.g., data processing device 120, terminal 130, etc.). As used herein, an alert signal may refer to a signal (e.g., an analog signal, a binary signal, etc.) to be sent for alerting, e.g., a control center, police, a hospital, a driver, that an alert event has been detected. In some embodiments, alert signals sent by monitoring device 110 may be assigned (e.g., by monitoring device 110) different urgency levels including, e.g., low urgency level, medium urgency level, high urgency level, and super high urgency level. For example, when a speeding event is detected, monitoring device 110 may assign an urgency level of the four urgency levels to the alert signal corresponding to the speeding event, based on the amount by which the speed of a vehicle exceeds the applicable speed limit. The urgency level may be expressed as a binary signal, a value, a color, or the like, or any combination thereof. For example, a low urgency level, medium urgency level, high urgency level, and super high urgency level may be expressed as a 1, 2, 3, and 4, respectively.

Monitoring device 110 may communicate or connect to one or more components of the surveillance system 100 (e.g., data processing device 120, terminal 130, storage 140, network 150, etc.). For example, monitoring device 110 may send data (e.g., data acquired by monitoring device 110, alert events, and/or alert signals) to terminal 130 or storage 140, e.g., through the network 150. In some embodiments, monitoring device 110 may send, through network 150, at least a portion of the acquired data to terminal 130 or storage 140, based on network condition of network 150 and urgency levels of the acquired data. As used herein, the urgency level of the data acquired by monitoring device 110 may correspond to the urgency level of an alert signal that is generated based on the acquired data. For instance, an alert signal of a high urgency level may correspond to acquired data of a high urgency level.

Data processing device 120 may be configured to receive alert signals, e.g., from monitoring device 110 and/or storage 140, and/or transmit the received alert signals to one or more components of the surveillance system 100 (e.g., terminal 130) via the network 150. In some embodiments, to send the alert signals to the one or more components of the surveillance system 100, data processing device 120 may determine network conditions (e.g., how much bandwidth of the network is occupied or available) at a certain time (e.g., a time point and/or a time period), and transmit, based on the determined network conditions, at least part of the received alert signals at the certain time. Exemplary time periods may cover 5 seconds, 10 minutes, 30 minutes, etc. As used herein, a certain time may also be referred to as a time of interest, both of which may refer to a time at which one or more alert signals are to be transmitted via the network, e.g., by data processing device 120.

In some embodiments, the alert signals may include a plurality of batches of alert signals, and data processing device 120 may transmit the alert signals at different times of interest. For example, the alert signals may include a first batch of alert signals and a second batch of alert signals. Data processing device 120 may transmit the first batch of alert signals at a certain time of interest (or referred to as a first time of interest), and later transmit the second batch of the alert signals at another time of interest (or referred to as a second time of interest). The second time of interest may be a time after the first time of interest. Data processing engine 120 may select the first batch of alert signals from the alert signals based on the network condition at the first time of interest and urgency levels of the alert signals. For example, data processing device 120 may determine, based on the network condition at the first time of interest, a communication protocol concerning urgency levels of the alert signals, and select the first batch of alert signals according to the determined communication protocol. As used herein, a communication protocol may refer to a protocol that may enable communication between data processing device 120 and the network 150 or a communication device (e.g., terminal 130). Detailed description of the communication protocol may be found elsewhere in the present disclosure. See, e.g., FIG. 5 and the description thereof.

Data processing device 120 may be a device that may process data. For example, data processing device 120 may include a high-performance computer specialized in processing and/or sending alert signals, a personal computer, a portable device, a server, a microprocessor, an integrated chip, a digital signal processor (DSP), a pad, a personal digital assistant (PDA), or the like, or a combination thereof. In some embodiments, data processing device 120 may be implemented on computing device 200 shown in FIG. 2.

Terminal 130 may be connected to or communicate with data processing device 120. Terminal 130 may allow one or more operators (e.g., a law enforcement officer, etc.) to control the production and/or display of the data (e.g., an alert event captured by monitoring device 110) on a display. Terminal 130 may include an input device, an output device, a control panel, a display (not shown in FIG. 1), or the like, or a combination thereof.

An input device may be a keyboard, a touch screen, a mouse, a remote controller, a wearable device, or the like, or a combination thereof. The input device may include alphanumeric and other keys that may be inputted via a keyboard, a touch screen (e.g., with haptics or tactile feedback, etc.), a speech input, an eye tracking input, a brain monitoring system, or any other comparable input mechanism. The input information received through the input device may be communicated to data processing device 120 via network 150 for further processing. Another type of the input device may include a cursor control device, such as a mouse, a trackball, or cursor direction keys to communicate direction information and command selections to, for example, data processing device 120 and to control the cursor movement on display or another display device.

A display may be configured to display the data received (e.g., the image captured by monitoring device 110). The information may include data before and/or after data processing, a request for input or parameter relating to image acquisition and/or processing, or the like, or a combination thereof. The display may include a liquid crystal display (LCD), a light emitting diode (LED)-based display, a flat panel display or curved screen (or television), a cathode ray tube (CRT), or the like, or a combination thereof.

Storage 140 may store data and/or relevant information or parameters. The data may include an alert signal (e.g., an image obtained by a camera.). The parameters may include an intrinsic parameter and/or an extrinsic parameter of, e.g., monitoring device 110. Exemplary intrinsic parameters of monitoring device 110 may include a parameter of the one or more cameras of monitoring device 110 including, for example, a focal length and/or a lens distortion parameter, or a combination thereof. Exemplary extrinsic parameters may include a pose and/or a position parameter of the one or more cameras of monitoring device 110 including, for example, a pitch angle, a roll angle, a yaw angle, and/or height, or a combination thereof.

Network 150 may facilitate communications between various components of surveillance system 100. Network 150 may be a single network, or a combination of various networks. Network 150 may be a wired network or a wireless network. The wired network may include using a Local Area Network (LAN), a Wide Area Network (WAN), a Bluetooth, a ZigBee, a Near Field Communication (NFC), or the like, or a combination thereof. The wireless network may be a Bluetooth, a Near Field Communication (NFC), a wireless local area network (WLAN), Wi-Fi, a Wireless Wide Area Network (WWAN), or the like, or a combination thereof.

In some embodiments, data processing device 120, and/or the storage 140 may be part of monitoring device 110. In some embodiments, data processing device 120 may be at the backend of monitoring device 110 so that data processing device 120 may retrieve data directly from monitoring device 110. In some embodiments, data processing device 120, storage 140 and monitoring device 110 may be connected to each other via network 150.

It should be noted that the descriptions above in relation to surveillance system 100 is provided for the purposes of illustration, and not intended to limit the scope of the present disclosure. For persons having ordinary skills in the art, various variations and modifications may be conducted under the guidance of the present disclosure. However, those variations and modifications do not depart the scope of the present disclosure. For example, part or all of the image data generated by monitoring device 110 may be processed by terminal 130. In some embodiments, monitoring device 110 and data processing device 120 may be implemented in one single device configured to perform the functions of monitoring device 110 and data processing device 120 described in this disclosure. In some embodiments, terminal 130 and storage 140 may be combined with or part of data processing device 120 as a single device. Similar modifications should fall within the scope of the present disclosure.

Figure 2:
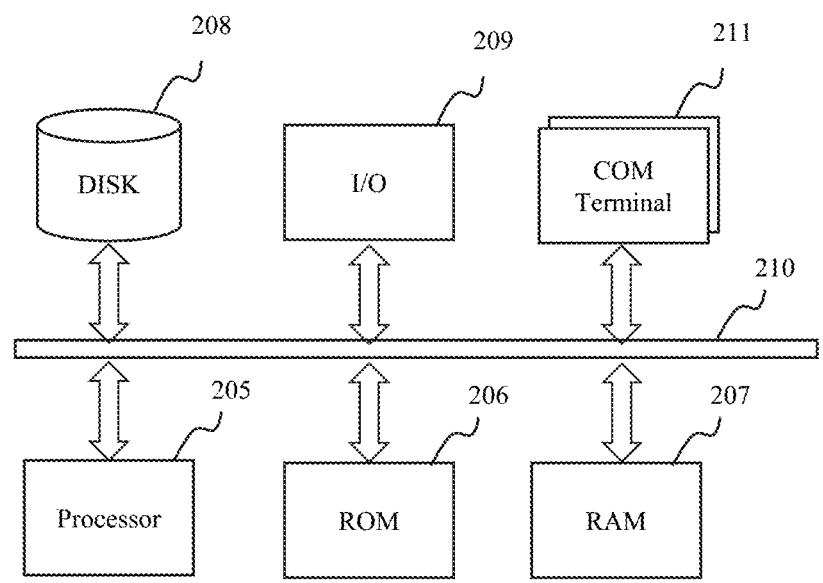
FIG. 2 is a schematic diagram illustrating exemplary hardware and software components of a computing device on which data processing system or a portion thereof may be implemented according to some embodiments of the present disclosure.

FIG. 2 illustrates a schematic diagram of an exemplary computing device according to some embodiments of the present disclosure. The computing device may be a computer, such as data processing device 120 in FIG. 1 and/or a specialized computer with specific functions, configured to implement any particular system according to some embodiments of the present disclosure. Computing device 200 may be configured to implement any components that perform one or more functions disclosed in the present disclosure. For example, data processing device 120 may be implemented in hardware devices, software programs, firmware, or the like, or any combination thereof. For illustration purposes, FIG. 2 depicts only one computing device. In some embodiments, the functions of the computing device may be implemented by a group of similar platforms in a distributed mode to disperse the processing load of the system.

Computing device 200 may include a communication terminal 211 connected to a network that may implement data communication. Computing device 200 may also include a processor 205 that is configured to execute instructions and includes one or more processors. The schematic computer platform may include an internal communication bus 210, different types of program storage units and data storage units (e.g., a hard disk 208, a read-only memory (ROM) 206, a random-access memory (RAM) 207), various data files applicable to computer processing and/or communication, and some program instructions executed possibly by processor 205. Computing device 200 may also include an I/O device 209 that may support the input and output of data flow between computing device 200 and other components of surveillance system 100 (e.g., monitoring device 110, terminal 130, network 150, etc.). Moreover, computing device 200 may receive programs and data via network 150.

Figure 3:
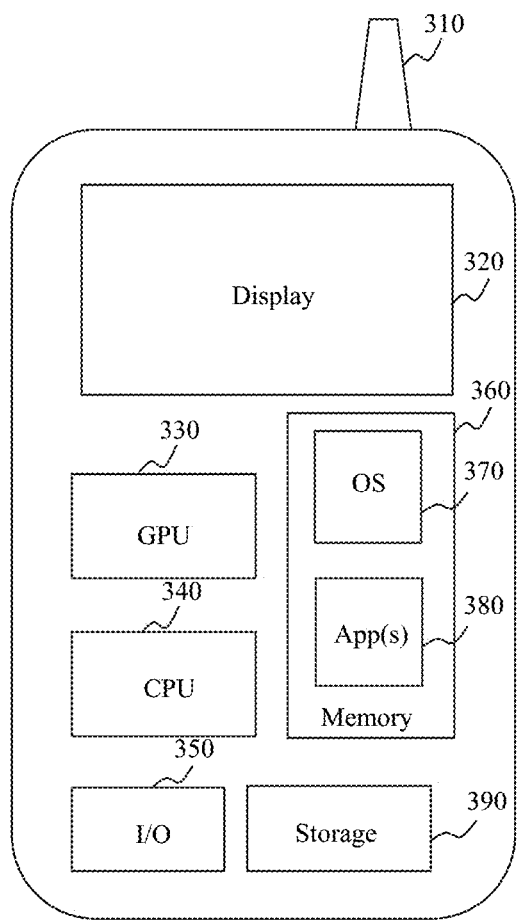
FIG. 3 is a schematic diagram illustrating exemplary hardware and/or software components of a mobile device on which a terminal may be implemented according to some embodiments of the present disclosure.

FIG. 3 is a schematic diagram illustrating exemplary hardware and/or software components of an exemplary mobile device 300 on which a terminal 130 may be implemented according to some embodiments of the present disclosure. As illustrated in FIG. 3, mobile device 300 may include a communication platform 310, a display 320, a graphic processing unit (GPU) 330, a central processing unit (CPU) 340, an I/O 350, a memory 360, a mobile operating system (OS) 370, a storage 390. In some embodiments, any other suitable component, including a system bus or a controller (not shown), may also be included in mobile device 300.

In some embodiments, a mobile operating system 370 (e.g., iOS™ Android™, Windows Phone™, etc.) and one or more applications 380 may be loaded into memory 360 from storage 390 in order to be executed by CPU 340. Applications 380 may include a browser or any other suitable mobile apps for receiving and rendering information relating to image processing or other information from surveillance system 100. User interactions with the information stream may be achieved via I/O 350 and provided to database 130, server 105 and/or other components of surveillance system 100. I/O 350 may also support the input and output of data flow between mobile device 300 and other components of surveillance system 100 (e.g., data processing device 120, network 150, etc.). In some embodiments, mobile device 300 may be an exemplary embodiment corresponding to terminal 130.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a system if appropriately programmed.

Figure 4A:
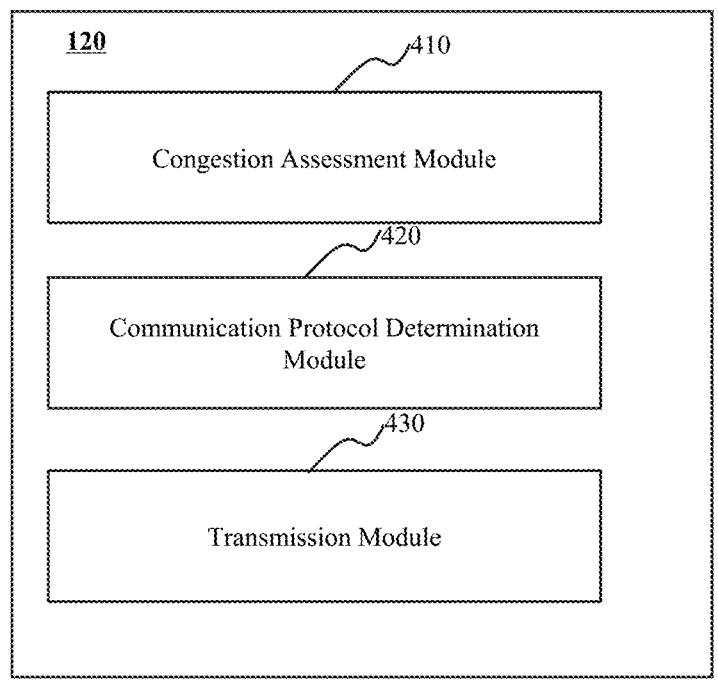
FIGS. 4A and 4B are block diagrams illustrating an exemplary processing device according to some embodiments of the present disclosure.

FIG. 4A is a block diagram illustrating an exemplary data processing device 120 according to some embodiments of the present disclosure. Data processing device 120 may include a congestion assessment module 410, a communication protocol determination module 420, and a transmission module 430.

The modules may be hardware circuits of all or part of data processing device 120. The modules may also be implemented as an application or a set of instructions read and executed by data processing device 120. Further, the modules may be any combination of the hardware circuits and the application/instructions. For example, the modules may be the part of data processing device 120 when data processing device 120 is executing the application/set of instructions.

Congestion assessment module 410 may be configured to perform a probability assessment of network congestion (or referred to as a congestion assessment, CGA) at a time of interest (or referred to as a first time interest). Through the CGA operation, a corresponding CGA value (or simply referred to as a CAG), may be determined. A CGA may also be expressed as a network congestion level, both of which may indicate the probability and/or severity of network congestion. The network congestion levels may include, e.g., no congestion, light congestion, medium congestion, and heavy congestion. The network congestion level may be expressed as a binary signal, a value, a color, or the like, or any combination thereof. For example, no congestion, light congestion, medium congestion, and heavy congestion may be expressed as values equal to or larger than 0. Higher congestion levels may be expressed as larger values. Merely by way of example, no congestion may be expressed as 0, and heavy congestion may be expressed as 1 or a value larger than 1.

In some embodiments, congestion assessment module 410 may determine the CGA at a certain time of interest on a certain day (e.g., a first time of interest) based on a round-trip time (RTT) at the time of interest, a shortest round-trip time (SRTT) corresponding to the time of interest, and/or a reference value of the time of interest. As used herein, an RTT may refer to a time interval between sending a message and receiving confirmation of receipt of the message (e.g., 0.1 s, 0.5 s, 1 s, 3 s, etc.). The SRTT corresponding to a time of interest may refer to a shortest RTT within a time duration (e.g., 5 seconds, 10 minutes, an hour, a day, a week, etc.) encompassing the time of interest. For example, the time of interest may be at 6:00 pm, on November $26^{th}$, and the time duration encompassing the time of interest may be from 5:50 pm on to 6:10 pm on the same day, November $26^{th}$. When the detected RTTs from 5:50 pm on November 26th to 6:10 pm on November 26th are 0.1 s, 0.2 s, 0.3 s, 2 s, respectively, the SRTT may equal to 0.1 s. A reference value (or referred to as an empirical value of the network condition) at a time of interest may provide reference information for the determination of the CGA at the time of interest. A reference value may be determined based on (e.g., determined to be equal to) an RTT or an average round-trip time (ARTT) at the corresponding (same) time on a previous day (e.g., yesterday, two days before, a week before, etc.). In some embodiments, a reference value may be determined based on an average round-trip (ARTT) in a time duration. For example, the reference value may equal the ARTT in the time duration. The ARTT may be an average value of the RTTs within the time duration.

In some embodiments, reference values may include a cyclic reference value, and/or an acyclic reference value. When the time of interest corresponds to or coincides with a cyclic pattern, the time of interest may correspond to one or more cyclic reference value. A cyclic pattern may refer to a pattern that recurs in cycles in an area or at a place (e.g., where surveillance system 100 monitors). A cyclic reference value for a time of interest may refer to an RTT or an ARTT at the same time as the time of interest on a day that corresponds to the time of interest according to the cyclic pattern. A cycle of the cyclic pattern may be a week, a month, a year, etc. Accordingly, a day corresponding to the time of interest may be the same day of, e.g., a previous week, a previous month, or a previous year. Merely by way of example, the time of interest, e.g., 6:00 pm, on November $26^{th}$, may correspond to a cyclic pattern in a weekly cycle, cyclic reference values of the time of interest may include an RTT (or ARTT) at 6:00 pm, on November $19^{th}$, one week before the time of interest. When the time of interest does not correspond to or coincide with a cyclic pattern, the time of interest may correspond to one or more acyclic reference values. An acyclic RTT may be designated by, e.g., a user.

In some embodiments, congestion assessment module 410 may determine a CGA at the time of interest based on the round-trip time (RTT) at the time of interest, the shortest round-trip time (SRTT) corresponding to the time of interest, and/or a cyclic reference value or an acyclic reference value, depending on whether the time of interest corresponds to a cyclic pattern. Detailed description of CGA may be found elsewhere in the present disclosure. See, e.g., FIG. 9 and the description thereof.

In some embodiments, congestion assessment module 410 may send the determined CGA to communication protocol determination module 240.

Communication protocol determination module 420 may determine a communication protocol for transmitting, e.g., via network 150, the alert signal(s) based on the CGA. The communication protocol may include a mechanism in which the alert signal(s) may be transmitted based on a value range of the CGA. In some embodiments, the communication protocol may include a plurality of portions including a first portion, a second portion, a third portion, a fourth portion, or the like, corresponding to different CGAs (congestion levels). Merely by way of example, the communication protocol may include four portions, a first portion, a second portion, a third portion, and a fourth portion corresponding to four different CGAs (congestion levels). In some embodiments, the communication protocol may determine urgency levels of alert signals to be transmitted, and may cause alert signals of certain urgency levels to be transmitted. For example, when the CGA is less than 0.60, the network may be deemed smooth and no limitation needs to be set for sending the alert signal(s). As another example, when the CGA is no less than 1, only alert signal(s) of a super high urgency level may be allowed to be sent. Communication protocol determination module 420 may send the determined communication protocol to the transmission module 430, which may cause the transmission module 430 to transmit alert signals accordingly.

The transmission module 430 may transmit at least part of the alert signal(s) based on the communication protocol via the network 150. An alert signal may correspond to an alert event, and may be assigned an urgency level. As described above, according to the communication protocol, alert signals of corresponding urgency levels may be transmitted by the transmission module 430, e.g., via the network 150.

Figure 4B:
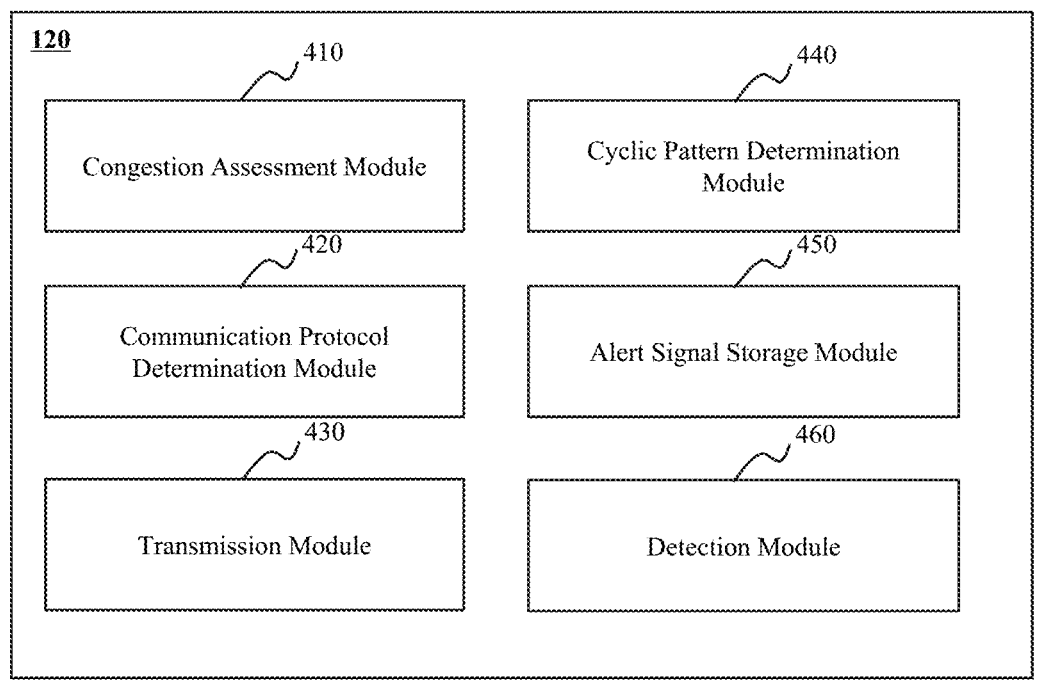

FIG. 4B is a block diagram illustrating an exemplary data processing device 120 according to some embodiments of the present disclosure. In addition to the components illustrated in FIG. 4A, data processing device 120 may further include a cyclic pattern determination module 440, an alert signal storage module 450, and a detection module 460.

Cyclic pattern determination module 440 may be configured to determine whether the time of interest corresponds to a cyclic pattern. Cyclic pattern determination module 440 may deem the time of interest corresponding to a cyclic pattern when the time of interest does not correspond to or coincide with a special event where surveillance system 100 monitors, e.g., a holiday where surveillance system 100 monitors. Otherwise, cyclic pattern determination module 440 may deem the time of interest not corresponding to a cyclic pattern. For example, the time of interest may be 6:00 pm on November $26^{th}$, which is not a holiday, and cyclic pattern determination module 440 may deem the time of interest corresponding to a cyclic pattern. As another example, the time of interest may be 6:00 pm on October $1^{st}$, which is a National Day where surveillance system 100 monitors, cyclic pattern determination module 440 may deem the time of interest not corresponding to a cyclic pattern.

As a further example, there may be more than one cyclic patterns. A cyclic pattern may be time based. For instance, a cyclic pattern may correspond to a regular workday or regular workdays of a week. A cyclic pattern may be event based. For instance, a cyclic pattern may correspond to a special event of a kind, e.g., a sport game, a regional, national or international show, etc. A cyclic pattern may be event and time based. For instance, a cyclic pattern may correspond to a special event of a kind occurred at a time, e.g., a sport game, a regional, national or international show, etc., on a weekday morning or evening, or on a weekend morning or evening. For illustration purposes, the following description is made with reference to a time-based cyclic pattern unless otherwise stated. However, this is not intended to limit the scope of the present disclosure. The systems and methods disclosed herein are applicable with respect to other type of cyclic patterns.

As used herein, a cyclic pattern may refer to a pattern that recurs in cycles in an area or at a place (e.g., where surveillance system 100 monitors). For instance, according to a cyclic pattern, the number of alert signals sent at the time of interest, and one or more times corresponding to the time of interest are roughly the same. As used herein, two certain numbers of the alert signals may be referred to be roughly the same when the difference between the two numbers are within a predetermined range (e.g., 5 percent, 10 percent, 20 percent, etc.). Illustrations of times corresponding to the time of interest may be found elsewhere in the present disclosure. See, for example, FIG. 4A and the description thereof. In some embodiments, a cycle of the cyclic pattern may include a predetermined time period, e.g., a day, a week, a month, a year, etc.

In response to the determination that the time of interest corresponds to the cyclic pattern, congestion assessment module 410 may obtain a cyclic empirical value of the network condition corresponding to the time of interest. In some embodiments, the cyclic empirical value of the network condition may include a network condition at a previous time that corresponds to the time of interest according to the cyclic pattern. The cyclic empirical value of network condition may include the at least one of a cyclic RTT ($RTT_{cyclic}$) or a cyclic ARTT ($ARTT_{cyclic}$). An $RTT_{cyclic}$ may refer to an RTT at a time that corresponds to the time of interest according to the cyclic pattern. An $ARTT_{cyclic}$ may refer to an average round-trip time of a time duration that encompasses a time which corresponds to the time of interest according to the cyclic pattern. As used herein, a time corresponding to the time of interest may be the same time as the time of interest on a certain day. For example, the time of interest is 6:00 pm, Wednesday, and the time corresponding to the time of interest may be 6:00 pm on a certain day. Accordingly, a time corresponding to the time of interest according to a cyclic pattern may refer to a time corresponding to the time of interest, on a day which corresponds to the time of interest according to the cyclic pattern. For example, the time of interest, e.g., 6:00 pm, Wednesday, may coincide with a cyclic pattern of a weekly cycle, and the time corresponding to the time of interest according to the cyclic pattern may be 6:00 pm on a previous Wednesday.

In response to a determination that the time of interest does not correspond to the cyclic pattern, an acyclic empirical value of the network condition corresponding to the time of interest may be obtained. An acyclic empirical value of a network condition corresponding to a time of interest may include a network condition corresponding to the time of interest which doesn't correspond to the cyclic pattern. In some embodiments, the acyclic empirical value of the network condition may include an acyclic ARTT ($ARTT_{acyclic}$). The $ARTT_{acyclic}$ may refer to the average round-trip time of a time duration that encompasses a time corresponding to the time of interest which does not correspond to a cyclic pattern.

Alert signal storage module 450 may be configured to store a batch of the alert signal(s) corresponding to one or more alert events that have not been sent. The urgency levels of the batch of the unsent alert signal(s) may be lower than the urgency levels of a batch of the alert signal(s) that have been sent.

Detection module 460 may be configured to detect whether there are alert signal(s) stored in alert signal storage module 450. In response to a detection that there are alert signal(s) stored in alert signal storage module 450, congestion assessment module 410 may determine the CGA periodically (e.g., at a preset time interval) or non-periodically (e.g., when there is no alert signal currently being transmitted or when the transmission of one or more alert signals scheduled to be transmitted is soon to be finished) until no alert signal needs to be sent via the network 150.

It should be noted that the descriptions above in relation to data processing device 120 is provided for the purposes of illustration, and not intended to limit the scope of the present disclosure. For persons having ordinary skills in the art, various variations and modifications may be conducted under the guidance of the present disclosure. However, those variations and modifications do not depart the scope of the present disclosure. For example, alert signal storage module 450 may be omitted, and the function of alert signal storage module 450 may be realized by storage 140.

As another example, data processing device 120 may include an alert signal generation module. The alert signal generation module may analyze data acquired by monitoring device 110 and generate alert signals accordingly. The alert signal generation module may further determine an urgency level of an alert event or the corresponding alert signal. The alert signal generation module may include process imaging data, audio data, or the like, or a combination thereof. For instance, the alert signal generation module may receive imaging data acquired by monitoring device 110, perform data processing (e.g., image processing), identify an alert event (e.g., a traffic accident, a traffic jam, a speeding event, an accident in a supermarket or a bank, etc.) based on the image processing, assign an urgency level to the identified alert event, and generate an alert signal accordingly. In some embodiments, one or both of monitoring device 110 and data processing device 120 (e.g., an alert signal generation module of data processing device 120) may identify alert events. For instance, monitoring device 120 may include a radar to identify speeding events, and data processing device 120 (e.g., an alert signal generation module of data processing device 120) may be configured to perform imaging processing and identify alert events based on imaging data acquired by an imaging component (e.g., a camera) of monitoring device 110.

Figure 5:
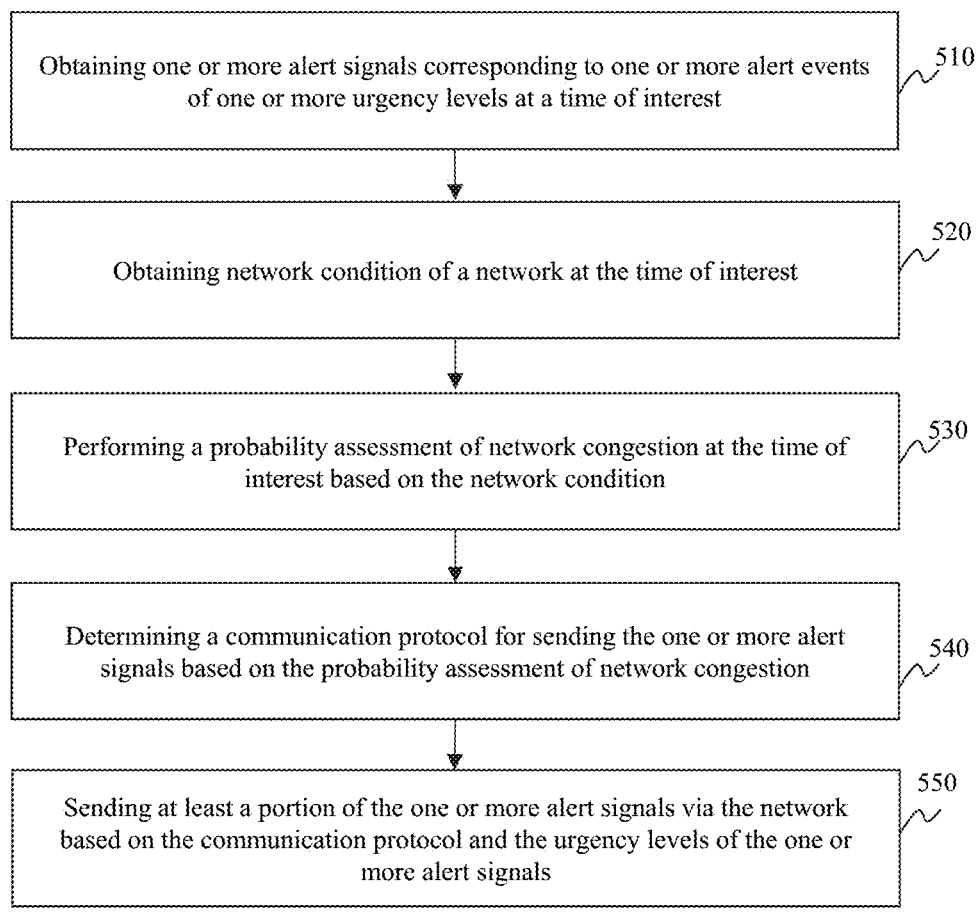
FIG. 5 is a flowchart illustrating an exemplary process for controlling network congestion according to some embodiments of the present disclosure.

FIG. 5 is a flowchart illustrating an exemplary process for controlling network congestion according to some embodiments of the present disclosure. At least a portion of process 500 may be implemented on computing device 200 as illustrated in FIG. 2 or mobile device 300. In some embodiments, one or more operations of process 500 may be implemented in surveillance system 100 as illustrated in FIG. 1. In some embodiments, one or more operations in process 500 may be stored in storage 140 and/or another storage (e.g., ROM 206, RAM 207, etc.) in the form of instructions, and invoked and/or executed by data processing device 120.

In 510, the transmission module 430 may obtain one or more alert signals. The alert signal(s) may be transmitted from one or more sensors of monitoring device 110 or from another component of data processing device 120 (e.g., an alert signal generation module). In some embodiments, the alert signal(s) may correspond to one or more alert events that occur at a time of interest. The alert event(s) may be any event(s) captured or detected in a surveillance system 100. The surveillance system 100 may include a road surveillance system, a supermarket surveillance system, a residential area surveillance system, a bank surveillance system, or the like, or any combination thereof. For example, an alert event may be a speeding event detected in the road surveillance system. In some embodiments, the alert signal(s) may have one or more urgency levels corresponding to the alert event(s). The urgency level(s) may include a low urgency level, a medium urgency level, a high urgency level, etc. For example, a speeding event in the road surveillance system may be assigned an urgency level based on the amount by which a vehicle exceeds the applicable speed limit.

In 520, congestion assessment module 410 may obtain a network condition of a network at a time of interest. In some embodiments, the network condition may include an RRT time at the time of interest, an SRTT of a time duration that encompasses the time of interest, and an empirical value of the network condition corresponding to the time of interest. In some embodiments, the empirical value of the network condition may be determined based on an ARTT in a time duration. The ARTT may refer to an average round-trip time in the time duration. In some embodiments, the ARTT may be determined according to Equation (1):

$$ARTT = \frac{\sum_{n}^{i=1} RTT_i}{n}, \quad (1)$$

wherein n represents the number of the detected RTTs within the time duration, i represents the $i^{th}$ detected RTT. In some embodiments, to determine CGAs of certain times of interest, ARTTs of a certain time duration on each day within a certain period of time may be recorded.

The applicable empirical value of the network condition may depend on whether the time of interest corresponds to a cyclic pattern. More descriptions regarding the determination of the empirical value of the network condition may be found elsewhere in the present disclosure. See, e.g., FIGS. 4A, 6, 9, and 10 and the descriptions thereof.

In 530, congestion assessment module 410 may determine a CGA at the time of interest. The CGA may be determined based on the network condition obtained in operation 520. In some embodiments, the CGA may include a cyclic CGA ($CGA_{cyclic}$) and an acyclic CGA ($CGA_{acyclic}$). As used herein, a cyclic CGA may refer to a CGA at a time that corresponds to or coincides with a cyclic pattern. An acyclic CGA may refer to a CGA at a time that does not correspond to or coincide with a cyclic pattern. More descriptions regarding the determination of the CGA may be found elsewhere in the present disclosure. See, e.g., FIGS. 9 and 10 and the descriptions thereof.

In 540, communication protocol determination module 420 may determine a communication protocol for sending the alert signal(s) based on the CGA(s). In some embodiments, the communication protocol may include a mechanism in which network 150 may send the alert signal(s) of urgency level(s) based on a value range of the CGA(s). In some embodiments, the communication protocol may include a plurality of portions including a first portion, a second portion, a third portion, a fourth portion, or the like, corresponding to different network congestion levels.

Merely by way of example, the communication protocol may include four portions, a first portion, a second portion, a third portion, and a fourth portion corresponding to four different network congestion levels. The network congestion levels may include, e.g., no congestion, light congestion, medium congestion, and heavy congestion. Detected alert events or the corresponding alert signals may be assigned four different urgency levels including, e.g., low urgency level, medium urgency level, high urgency level, and super high urgency level. The first portion may correspond to no network congestion at the time of interest. According to the first portion of the communication protocol, no limitation may be set for sending detected alert signal(s). The second portion may correspond to a light network congestion at the time of interest. According to the second portion of the communication protocol, the alert signal(s) above the low urgency level (e.g., including the alert signal(s) of a medium urgency level, a high urgency level, and/or a super high urgency level) may be allowed to be sent. The third portion may correspond to a medium network congestion at the time of interest. According to the third portion of the communication protocol, the alert signal(s) above the medium urgency level (e.g., including the alert signal(s) of a high urgency level and/or a super high urgency level) may be allowed to be sent. The fourth portion may corresponding to a heavy network congestion at the time of interest. According to the fourth portion of the communication protocol, only the alert signal(s) of a super high urgency level may be allowed to be sent. For example, when $0.0 \le CGA < 0.60$, the network may be deemed to have no congestion, and the first portion of the communication protocol may be applicable, and therefore there is no limitation for sending detected alert signal(s).

In 550, the transmission module 430 may transmit, via the network 150, at least part of the alert signal(s) obtained in operation 510. The part of the alert signal(s) may be sent based on the communication protocol and the urgency level(s) of the alert signal(s). For example, when $0.80 \le CGA < 1.0$, the network may be deemed to have a medium congestion, and the third portion of the communication protocol may be applicable, and then only alert signal(s) of the high urgency level or the super high urgency level may be allowed to be sent. In some embodiments, the alert signal(s) that have not been sent may be stored in alert signal storage module 450 and may be sent when the network condition permits (e.g., when there is no network congestion). More descriptions regarding the handling of alert signal(s) that is/are set not to be sent at a time of interest may be found elsewhere in the present disclosure. See, e.g., FIGS. 7, 9, and 10 and the descriptions thereof.

It should be noted that the above description regarding the process 500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations in process 500 may be omitted or one or more additional operations may be added. For example, an additional operation of storing alert signal(s) may be added after operation 550. As another example, process 500 may further include determining whether the time of interest corresponds to the cyclic pattern.

Figure 6:
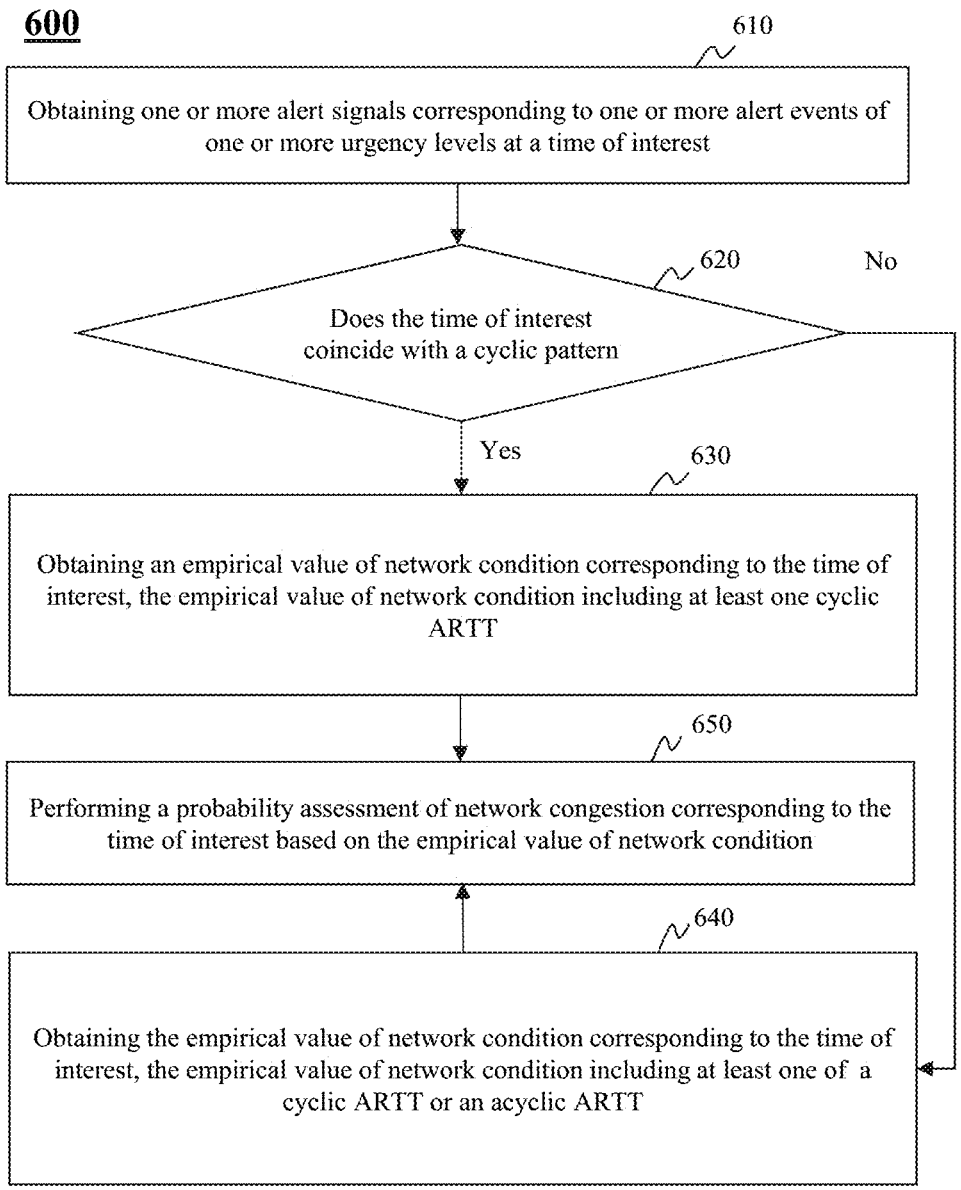
FIG. 6 is a flowchart illustrating an exemplary process for determining a probability assessment of network condition according to some embodiments of the present disclosure.

FIG. 6 is a flowchart illustrating an exemplary process for determining a CGA according to some embodiments of the present disclosure. At least a portion of process 600 may be implemented on the computing device 200 as illustrated in FIG. 2 or mobile device 300. In some embodiments, one or more operations of process 500 may be implemented in Surveillance system 100 as illustrated in FIG. 1. In some embodiments, one or more operations in process 600 may be stored in storage device 140 and/or another storage (e.g., ROM 206, RAM 207, etc.) in the form of instructions, and invoked and/or executed by data processing device 120. In some embodiments, part or all of process 600 may be performed to achieve operation 520 as described in connection with FIG. 5.

In 610, transmission module 430 may obtain one or more alert signals at a time of interest. The alert signal(s) may be transmitted from one or more sensors of monitoring device 110 or from another component of data processing device 120 (e.g., an alert signal generation module). Operation 610 may be similar to 510 in process 500, and the descriptions thereof are not repeated here.

In 620, a cyclic pattern determination module 440 may determine whether the time of interest corresponds to a cyclic pattern. Cyclic pattern determination module 440 may deem the time of interest to correspond to a cyclic pattern when the time of interest does not correspond to a special day where the alert events are detected. For instance, the time of interest is not on a holiday where the alert events are detected. In some embodiments, there may be a library recording special days (e.g., holidays) and/or events against which cyclic pattern determination module 440 may compare the time of interest to determine whether the time of interest corresponds to the cyclic pattern. The library may be stored in cyclic pattern determination module 440 or retrieved by cyclic pattern determination module 440 from another module or storage device. Otherwise, cyclic pattern determination module 440 may deem the time of interest not to correspond to a cyclic pattern. For example, the time of interest may be 6:00 pm on November $26^{th}$, which is not a holiday where the alert events are detected, and cyclic pattern determination module 440 may deem the time of interest to correspond to a cyclic pattern. As another example, the time of interest may be 6:00 pm on October $1^{st}$, which is a holiday where the alert events are detected as recorded in the library, cyclic pattern determination module 440 may deem the time of interest not to correspond to a cyclic pattern.

In response to the determination that the time of interest corresponds to the cyclic pattern in 620, data processing device 120 may execute 630. In 630, congestion assessment module 410 may obtain an empirical value of the network condition corresponding to the time of interest. In some embodiments, the empirical value of network condition at the time of interest that corresponds to the cyclic pattern may include an $ARTT_{cyclic}$.

In response to the determination that the time of interest doesn't correspond to the cyclic pattern in 620, data processing device 120 may execute 640. In 640, congestion assessment module 410 may obtain an empirical value of the network condition corresponding to the time of interest. In some embodiments, the empirical value of the network condition corresponding to the time of interest that does not correspond to the cyclic pattern may include at least one of an $ARTT_{cyclic}$ or an $ARTT_{acyclic}$.

In 650, congestion assessment module 410 may determine a CGA corresponding to the time of interest based on the empirical value of the network condition. More descriptions regarding the determination of the CGA may be found elsewhere in the present disclosure. See, e.g., FIGS. 9 and 10 and the relevant descriptions.

It should be noted that the above description regarding the process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations in process 600 may be omitted or one or more additional operations may be added. For example, an operation for storing the empirical value of network condition may be added between 630 and 640.

Figure 7:
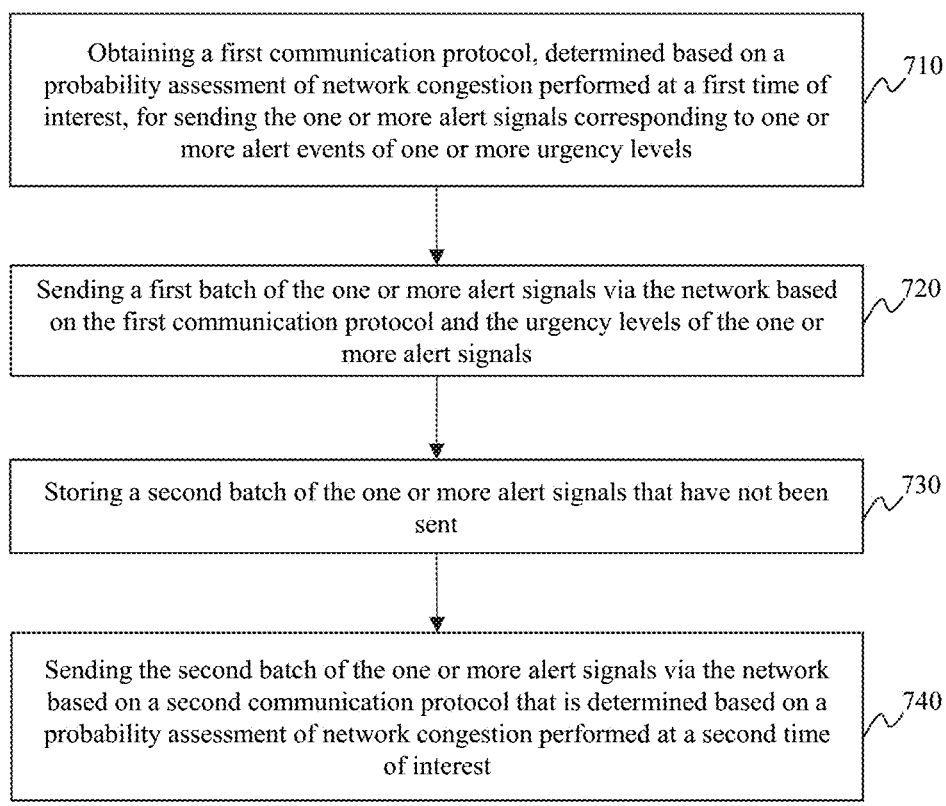
FIG. 7 is a flowchart illustrating an exemplary process for sending one or more alert signals according to some embodiments.

FIG. 7 is a flowchart illustrating an exemplary process for sending one or more alert signals according to some embodiments of the present disclosure. At least a portion of process 700 may be implemented on the computing device 200 as illustrated in FIG. 2 or mobile device 300. In some embodiments, one or more operations of process 700 may be implemented in Surveillance system 100 as illustrated in FIG. 1. In some embodiments, one or more operations in process 600 may be stored in storage device 140 and/or another storage (e.g., ROM 206, RAM 207, etc.) in the form of instructions, and invoked and/or executed by data processing device 120. In some embodiments, part or all of the process 700 may be performed to achieve operation 550 as described in connection with FIG. 5.

In 710, communication protocol determination module 420 may determine, based on a CGA at a first time of interest, a communication protocol at the first time of interest (or referred to as a first communication protocol) for sending the alert signal(s) corresponding to one or more alert events of one or more urgency levels. According to the first communication protocol, alert signals of certain urgency levels may be transmitted. For example, when the CGA is determined to be less than 0.60, the network may be deemed having no congestion and there is no limitation set for sending the alert signal(s) according to the communication protocol. As another example, when the CGA is determined to be 1.0, the network may be deemed heavily congested and the only alert signal(s) of the super high urgency level may be allowed to be sent according to the communication protocol. More descriptions regarding the communication protocol may be found elsewhere in the present disclosure. See, e.g., FIG. 5 and the relevant descriptions.

In 720, the transmission module 430 may send a first batch (or referred to as a sent batch) of the alert signal(s) via the network based on the first communication protocol, and the urgency levels of the alert signal(s). In some embodiments, the first batch of the alert signal(s) may include alert signal(s) of a higher urgency level than other alert signal(s) that have not been sent. For example, when the network is deemed congested to some extent (e.g., light congestion, medium congestion, or heavy congestion), the first batch may include the alert signal(s) of a certain urgency level according to the communication protocol. The transmission of the first batch of alert signal(s) may take a certain amount of time. For instance, the alert signal(s) of the first batch may be scheduled to be sent according to an order over a period of time (e.g., within 5 seconds, within 10 seconds, within 1 minute, within 3 minutes, etc.) from the time of interest.

In 730, alert signal storage module 450 may store a second batch (or referred to as an unsent batch) of the alert signal(s) that have not been sent (or scheduled at the time of interest to be sent at a certain time point or within a certain time period from the time of interest). In some embodiments, the second batch of the alert signal(s) may be the alert signal(s) of a lower urgency level than other alert signal(s) that have been sent. For example, when the network is deemed heavily congested, the second batch may include the alert signal(s) of a low urgency level, a medium urgency level, and/or a high urgency level.

In 740, the transmission module 430 may send the second batch of the alert signal(s) via the network based on an updated communication protocol (or referred to as a second communication protocol) at a second time of interest. In some embodiments, the second communication protocol may be determined based on a CGA at second time of interest. The second time of interest may be a time after the first time of interest. In some embodiments, the CGA time of interest may be determined periodically (e.g., at a preset time interval) or non-periodically (e.g., triggered by a signal such as a signal that no alert signal is being transmitted or the transmission of the first batch has been finished) until alert signal storage module 450 stores no more alert signals. The preset time interval may be, e.g., 10 minutes, 20 minutes, 1 hour. The preset time interval may vary with the urgency levels of the second batch of the alert signal(s). For example, the preset time interval may be short (e.g., 3 minutes) when the second batch includes alert signal(s) of a high urgency level, while the preset time interval may be long (e.g., 15 minutes) when the second batch includes alert signal(s) of a low urgency level.

It should be noted that the above description regarding the process 700 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations in process 700 may be omitted or one or more additional operations may be added. For example, the process 700 may further include an operation for sending a third batch of the alert signals after 740. As another example, the second batch of alert signals that have not been sent according to the first communication protocol may be stored in the storage device and not sent. A user or a component of the system may retrieve the second batch of alert signals with or without relevant information from the storage device.

FIG. 8 is a flowchart illustrating another exemplary process 800 for controlling network congestion according to some embodiments of the present disclosure. At least a portion of process 800 may be implemented on the computing device 200 as illustrated in FIG. 2 or mobile device 300. In some embodiments, one or more operations of process 800 may be implemented in Surveillance system 100 as illustrated in FIG. 1. In some embodiments, one or more steps in the process 800 may be stored in storage device 140 and/or the storage (e.g., the ROM 206, the RAM 207, etc.) in the form of instructions, and invoked and/or executed by data processing device 120. In some embodiments, the method for controlling network congestion disclosed herein may be applied to any network that may need to transmit alert signal(s), for example, a video surveillance system. In some embodiments, the method for controlling network congestion may be applied to other networks prone to network congestion.

In 810, a CGA at a time of interest may be determined. Operation 810 may be executed by congestion assessment module 410. In some embodiments, the CGA at the time of interest may be determined by performing a probability assessment of network congestion at the time of interest based on an RTT at the time of interest, an SRTT of a time duration that encompasses the time of interest, and/or an empirical value of network condition corresponding to the time of interest. In some embodiments, the time of interest may correspond to a time point (or a time period) when one or more alert signals need to be sent (e.g., from monitoring device 110, or data processing device 120) via the network.

In some embodiments, a value range of the CGA may be divided into categories based on a predetermined rule. The categories may correspond to different alert signal(s) of one or more urgency levels. For example, the value range of the CGA may be divided into four categories based on the predetermined rule. The four categories may include: no less than 0 and less than 0.6, no less than 0.6 and less than 0.8, no less than 0.8 and less than 1, and no less than 1.

In some embodiments, the communication protocol may be determined based on the CGA determined when the alert signal(s) to be sent so that in real-time alert signal(s) of relatively high urgency level(s) may be sent with priority. Meanwhile, whenever there are alert signal(s) stored locally, the communication protocol may also be determined based on the CGA determined at a preset time interval until all alert signal(s) are sent. In some embodiments, the process may take a long time in various surveillance system 100.

In 820, a communication protocol may be determined for transmitting the alert signal(s). Operation 820 may be executed by communication protocol determination module 420. In some embodiments, the communication protocol may be determined based on the CGA and the relationship between the communication protocol and the CGA. The correspondence relationship between the value range of the CGA and the communication protocol may be shown as follows:

| Categories | Communication protocol |
| --- | --- |
| 1) 0.0 <= CGA < 0.60 | First portion, no limitation set for sending alert signal(s), |
| 2) 0.60 <= CGA < 0.80 | Second portion, the alert signal(s) above the low urgency level may be allowed to be sent, |
| 3) 0.80 <= CGA < 1.0 | Third portion, the alert signal(s) above the medium urgency level may be allowed to be sent, |
| 4) 1.0 <= CGA | Fourth portion, the alert signal(s) of the super high urgency level may be allowed to be sent. |

In 830, at least a portion of the alert signal(s) corresponding to one or more alert events may be transmitted via a network. Operation 830 may be executed by the transmission module 430. The alert signal(s) may be sent based on the communication protocol. For example, when the value of CGA equals to 0.7, the network may be deemed to have light network congestion and the second portion of the communication protocol may be applicable, and therefore the alert signal(s) above the low urgency level (e.g., including the alert signal(s) of the medium urgency level, the high urgency level, and/or the super high urgency level) may be allowed to be sent. As another example, when the value of the CGA equals to 0.9, the network may be deemed to have the medium network congestion and the third portion of the communication protocol may be applicable, and therefore the alert signal(s) above the medium urgency level (e.g., including the alert signal(s) of a high urgency level and/or a super high urgency level) may be allowed to be sent.

In some embodiments, when the portion of the alert signal(s) have been sent, the alert signal(s) that have not been sent may be stored locally for sending until the network condition permits. In some embodiments, a CGA may be determined at a preset time interval until no more alert signal needs to be sent. A second communication protocol may be determined based on the CGA at the second time of interest.

In some embodiments, new alert events may be detected and alert signals be generated at a second time of interest subsequent to a first time of interest before all alert signals corresponding to alert events detected at the first time of interest are sent. For instance, one or more alert signals corresponding to alert events detected at the first time of interest (or referred to as unsent alert signal(s)) may be stored according to a first communication protocol corresponding to the first time of interest. A second communication protocol corresponding to the second time of interest may be determined. The second communication protocol may be applicable to determine the transmission of the new alert signals corresponding to alert events detected at the second time of interest and also the unsent alert signals corresponding to alert events detected at the first time of interest.

Merely by way of example, in the road surveillance system, the value of the CGA may be 0.95 at 6:30 PM, Wednesday (or referred to as time point A), the network may correspond to a medium network congestion, and the third portion of the communication protocol may be applicable and therefore the alert signal(s) above the medium urgency level may be allowed to be sent while the alert signal(s) of the low urgency level, or below the low urgency level, if exists, may be stored locally. Then the CGA may be performed every 10 minutes from time point A. At time point B of 7:00 PM, the value of the CGA may be determined as 0.7, the network may correspond to a light network congestion, the alert signal(s) above the low urgency level (e.g., including the alert signal(s) of a medium urgency level, a high urgency level, and/or a super high urgency level) generated based on alert events corresponding to time point B may be allowed to be sent. In some embodiments, when alert signal(s) occur, a process of determination of the CGA at the time of interest, and a process of determining the CGA at a preset time interval after the alert signal(s) of a lower urgency level are stored locally may be two processes executed separately so that the alert signal(s) of a higher urgency level may be sent in time.

In some embodiments, when the alert signal(s) is to be sent, a plurality of following operations may also be performed before the CGA at the time of interest is determined. For example, the operations may include determining whether the time of interest corresponds to a cyclic pattern. It should be noted here that, for illustration purposes, the present description uses determining whether the time of interest corresponds to a cyclic pattern as an example. Alternatively, whether an alert signal(s) corresponds to the cyclic pattern may be performed. For example, there may be a library recording alert signals against which cyclic pattern determination module 440 may compare a certain alert signal to determine whether the alert signal corresponds to the cyclic pattern. The library may be stored in cyclic pattern determination module 440 or retrieved by cyclic pattern determination module 440 from another module or storage device.

In some embodiments, the time of interest corresponds to the cyclic pattern. The empirical value of the network condition may include at least one ARTT of a time duration encompassing a time that corresponds to the time of interest according to the cyclic pattern.

In some embodiments, the time of interest may be deemed corresponding to the cyclic pattern if the time of interest does not correspond to or coincide with a special event where surveillance system 100 monitors, e.g., a holiday where surveillance system 100 monitors. For example, during morning and evening peak hours of each workday (non-national-holiday) in the road surveillance system and after-work hours in the evening of each workday in a supermarket surveillance system, the number of alert signal(s) generated in the road monitoring network and/or the supermarket surveillance system may be large. The road surveillance system and/or the supermarket surveillance system may be prone to congestion. The time durations of congestion in the road surveillance system and/or the supermarket surveillance system may be similar, and the number of alert signal(s) may be generally cyclic weekly or daily.

In some embodiments, the empirical value of the network condition corresponding to the time of interest may include at least one $ARTT_{cyclic}$. The $ARTT_{cyclic}$ may refer to an ARTT in a time duration that encompasses a time corresponding to the time of interest according to a cyclic pattern. The cycle of the cyclic pattern may be set based on different application environments and/or times of interest.

A time of interest may correspond to one or more cyclic patterns. For example, the time of interest is 3:50 PM, Wednesday. Wednesday is a workday. In one respect, it may be assumed that the probability of network congestion at 3:50 PM of each Wednesday is similar. Accordingly, the time of interest may correspond to a cyclic pattern of a weekly cycle. The ARTT of a time duration encompassing 3:50 PM (such as 3:30 PM to 4:00 PM) on the previous Wednesday may be selected as the empirical value of the network condition. In another respect, the day before Wednesday is Tuesday, which is also a workday. Thus, the time of interest may correspond a cyclic pattern of a daily cycle. Accordingly, the ARTT of a time duration encompassing 3:50 PM (such as 3:30 PM to 4:00 PM) on Tuesday may also be selected as the empirical value of the network condition.

In some embodiments, weighted values for the RTT at the time of interest, and the empirical value of the network condition may be introduced to determine the CGA at the time of interest. The CGA at the time of interest may be determined based on an RTT at the time of interest, weighted value of the RTT, an SRTT corresponding to the time of interest, and/or at least one empirical value of the network condition and its corresponding weighed value.

In some embodiments, if the time of interest corresponds to the cyclic pattern, the CGA at the time of interest (or referred to as $CGA_{cyclic}$) may be determined according to:

$$CGA_{cyclic} = \frac{\left[\frac{a \times ARTT_{cyclic} + b \times RTT}{a+b}\right] - SRTT}{SRTT} = \frac{\left[\frac{a \times ARTT_{cyclic} + b \times RTT}{a+b}\right]}{(a+b) \times SRTT} - 1, \quad (2)$$

where $ARTT_{acyclic}$ represents a cyclic ARTT corresponding to the time of interest, RTT represents the RTT at the time of interest, SRTT represents the shortest RTT within a certain time period encompassing the time of interest, a represents the weighted value of $ARTT_{cyclic}$ (or referred to as first cyclic weighted value), and b represents the weighted value of RTT (or referred to as a second cyclic weighted value). a and b may be equal to or larger than 0.

In some embodiments, the time of interest does not correspond to the cyclic pattern. The empirical value of the network condition may include the at least one $ARTT_{cyclic}$ and an $ARTT_{acyclic}$.

In some embodiments, the time of interest may be deemed not corresponding to a cyclic pattern when the alert signal(s) to be sent at the time of interest does not correspond to the cyclic pattern. For example, the number of alert signal(s) that may need to be sent via the network on the morning or evening of the Mid-Autumn Festival (or another holiday where the alert events are detected as recorded in the library) in the road surveillance system may be much more than that on a usual workday. Similarly, the number of alert signal(s) that may need to be sent via the network on the afternoon of the Mid-Autumn Festival (or another holiday where the alert events are detected as recorded in the library) in the supermarket surveillance system may be much more than that on a usual workday. Accordingly, the network may be prone to congestion, and a time of interest on such a holiday or the alert signals that need to be sent at the time of interest does not correspond to a cyclic pattern.

In some embodiments, an $ARTT_{acyclic}$ corresponding to the time of interest may be determined to be an ARTT in a time duration that encompasses a time corresponding to the time of interest, on a recent holiday. For example, the time of interest is 9:00, on the first day of the Mid-Autumn Festival, which does not correspond to a cyclic pattern. The $ARTT_{acyclic}$ corresponding to the time of interest may be an ARTT at 9:00 (in a time duration encompassing 9:00) on the first day of the Dragon Boat Festival.

In some embodiments, when the time of interest does not correspond to a cyclic pattern, a weighted value of the ARTT (or referred to as $ARTT_{acyclic}$) may be introduced to determine the CGA at the time of interest (or referred to as $CGA_{acyclic}$).

In some embodiments, if the time of interest does not correspond to a cyclic pattern, the $CGA_{acyclic}$ may be determined according to Equation (3):

$$CGA_{cyclic} = \frac{\left[\frac{a \times ARTT_{cyclic} + b \times RTT + c \times ARTT_{acyclic}}{a+b+c}\right] - SRTT}{SRTT} = \frac{\left[\frac{a \times ARTT_{cyclic} + b \times RTT + c \times ARTT_{acyclic}}{a+b+c}\right]}{(a+b+c) \times SRTT} - 1, \quad (3)$$

where $ARTT_{cyclic}$ represents a cyclic ARTT corresponding to the time of interest, $ARTT_{acyclic}$ represents an acyclic ARTT corresponding to the time of interest, RTT represents the RTT at the time of interest, SRTT represents the shortest RTT within a certain time period encompassing the time of interest, a represents the weighted value of $ARTT_{cyclic}$ (or referred to as first cyclic weighted value), b represents the weighted value of RTT (or referred to as a second cyclic weighted value), and c represents the weighted value of the $ARTT_{acyclic}$ (or referred to as a third weighted value). a, b, and c may be equal to or larger than 0.

As illustrated above, regardless of whether the time of interest corresponds to a cyclic pattern, the empirical value of the network condition may include at least one $ARTT_{cyclic}$. The at least one $ARTT_{cyclic}$ may correspond to at least one cyclic pattern, the cycle of which may be set. For example, the cycle of the cyclic pattern may be a month, a week, or a day. That is, the cyclic pattern recurs every month, every week, or every day.

In some embodiments, the time of interest may correspond to one or more cyclic patterns of one or more cycles. The $ARTT_{cyclic}$ in Equation (2) and Equation (3) may be determined according to:

$$ARTT_{cyclic} = \frac{d \times ARTT_{monthly} + e \times ARTT_{weekly} + f \times ARTT_{daily}}{d+e+f}, \quad (4)$$

where $ARTT_{monthly}$ represents an ARTT corresponding to the time of interest according to a cyclic pattern of monthly cycle. d represents a weighted value of the $ARTT_{monthly}$ (or referred to as a fourth weighted value). d may be equal to or larger than 0. $ARTT_{weekly}$ represents an ARTT corresponding to the time of interest according to a cyclic pattern of a weekly cycle (a cyclic pattern recurring every week). e represents a weighted value of the $ARTT_{weekly}$ (or referred to as a fifth weighted value). e may be equal to or larger than 0. $ARTT_{daily}$ represents an ARTT corresponding to the time of interest according to a cyclic pattern of a daily cycle (a cyclic pattern recurring every day). f represents a weighted value of the $ARTT_{daily}$ (or referred to as a sixth weighted value). f may be equal to or larger than 0. In some embodiments, d, e, and f may be of the same order of magnitude.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, other equations transformed from the equations above may also be used to determine CGA at the time of interest.

Figure 9:
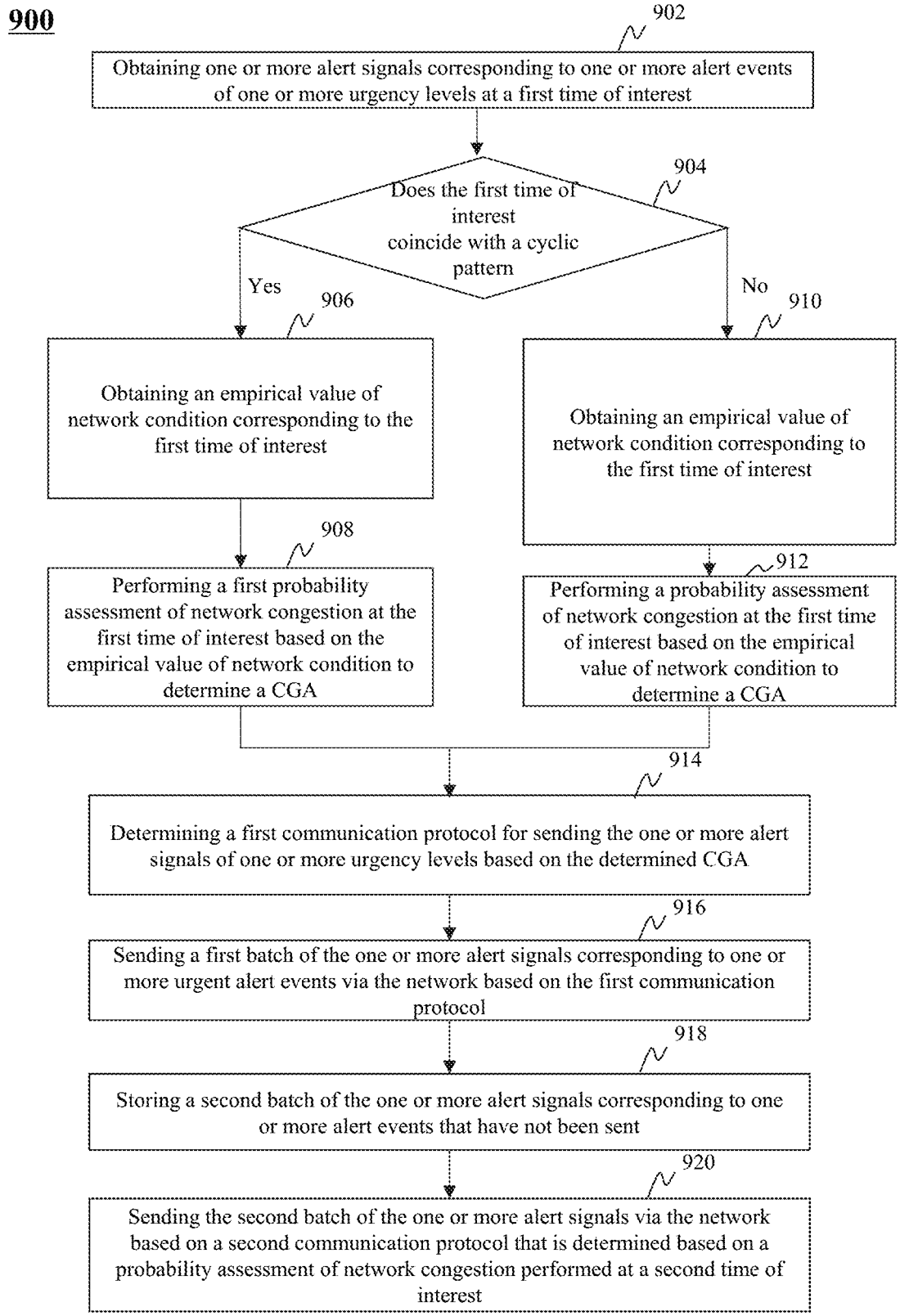
FIG. 9 is a flowchart illustrating an exemplary process for determining a probability assessment of network condition according to some embodiments of the present disclosure.

FIG. 9 is a flowchart of an exemplary process and/or method 900 for controlling network congestion according to some embodiments of the present disclose. At least a portion of process 900 may be implemented on the computing device 200 as illustrated in FIG. 2 or mobile device 300. In some embodiments, one or more operations of process 800 may be implemented in Surveillance system 100 as illustrated in FIG. 1. In some embodiments, one or more steps in the process 900 may be stored in storage device 140 and/or the storage (e.g., the ROM 206, the RAM 207, etc.) in the form of instructions, and invoked and/or executed by data processing device 120.

In 902, one or more alert signals corresponding to one or more alert events of one or more urgency levels may be obtained at a first time of interest. Operation 902 may be executed by the transmission module 430. The alert signal(s) may be transmitted from one or more sensors of monitoring device 110 via network 150.

In 904, whether the first time of interest corresponds to a cyclic pattern may be determined. Operation 904 may be executed by cyclic pattern determination module 440. In some embodiments, cyclic pattern determination module 440 may deem the first time of interest corresponding to the cyclic pattern when the first time of interest does not correspond to or coincide with a special event where surveillance system 100 monitors, e.g., a holiday where surveillance system monitors. In response to the determination that the first time of interest corresponds to the cyclic pattern 906 may be performed. In response to the determination that the first time of interest dose not correspond to the cyclic pattern, 910 may be performed.

In 906, an empirical value of network condition corresponding to the first time of interest may be obtained. The empirical value of network condition may include at least one $ARTT_{cyclic}$.

In 908, a probability assessment of network congestion at the time of interest may be performed based on the empirical value of the network condition obtained in 906. Operation 908 may be executed congestion assessment module 410. In 908, a cyclic CGA (or $CGA_{cyclic}$) may be determined. In some embodiments, the $CGA_{cyclic}$ may be determined according to equation (2) as illustrated in FIG. 8 and its relevant descriptions, which are not repeated here.

In 910, an empirical value of the network condition corresponding to the first time of interest may be obtained. Operation 910 may be executed congestion assessment module 410. The empirical value of the network condition may include at least one of an $ARTT_{cyclic}$ or an $ARTT_{acyclic}$.

In 912, a probability assessment of network congestion at the first time of interest may be performed based on the empirical value of the network condition obtained in 910. Operation 912 may be executed by congestion assessment module 410. In 912, an $CGA_{acyclic}$ may be determined. The $CGA_{acyclic}$ may be determined according to equation (3) as illustrated in FIG. 8 and its relevant descriptions, which are not repeated here.

In 914, a first communication protocol for sending the one or more alert signals with one or more urgency levels may be determined based on the determined CGA. Operation 914 may be executed by communication protocol determination module 420.

In 916, a first batch (or referred to as a sent batch) of the one or more alert signals corresponding to one or more alert events via the network may be sent based on the first communication protocol. Operation 916 may be executed by transmission module 430.

In 918, a second batch (or referred to as an unsent batch) of the one or more alert signals corresponding to one or more alert events that have not been sent may be stored. Operation 918 may be executed by alert signal storage module 450.

In 920, the second batch of the one or more alert signals via the network based on a second communication protocol may be sent. Operation 920 may be executed by transmission module 430. In some embodiments, the second communication protocol is determined based on a CGA performed at a second time of interest. The second time of interest may be a time after the first time of interest.

It should be noted that the above description regarding the process 900 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations in process 900 may be omitted or one or more additional operations may be added. For example, an operation for storing the empirical value of the network condition may be added between 906 and 908, or between 910 and 912.

Figure 10:
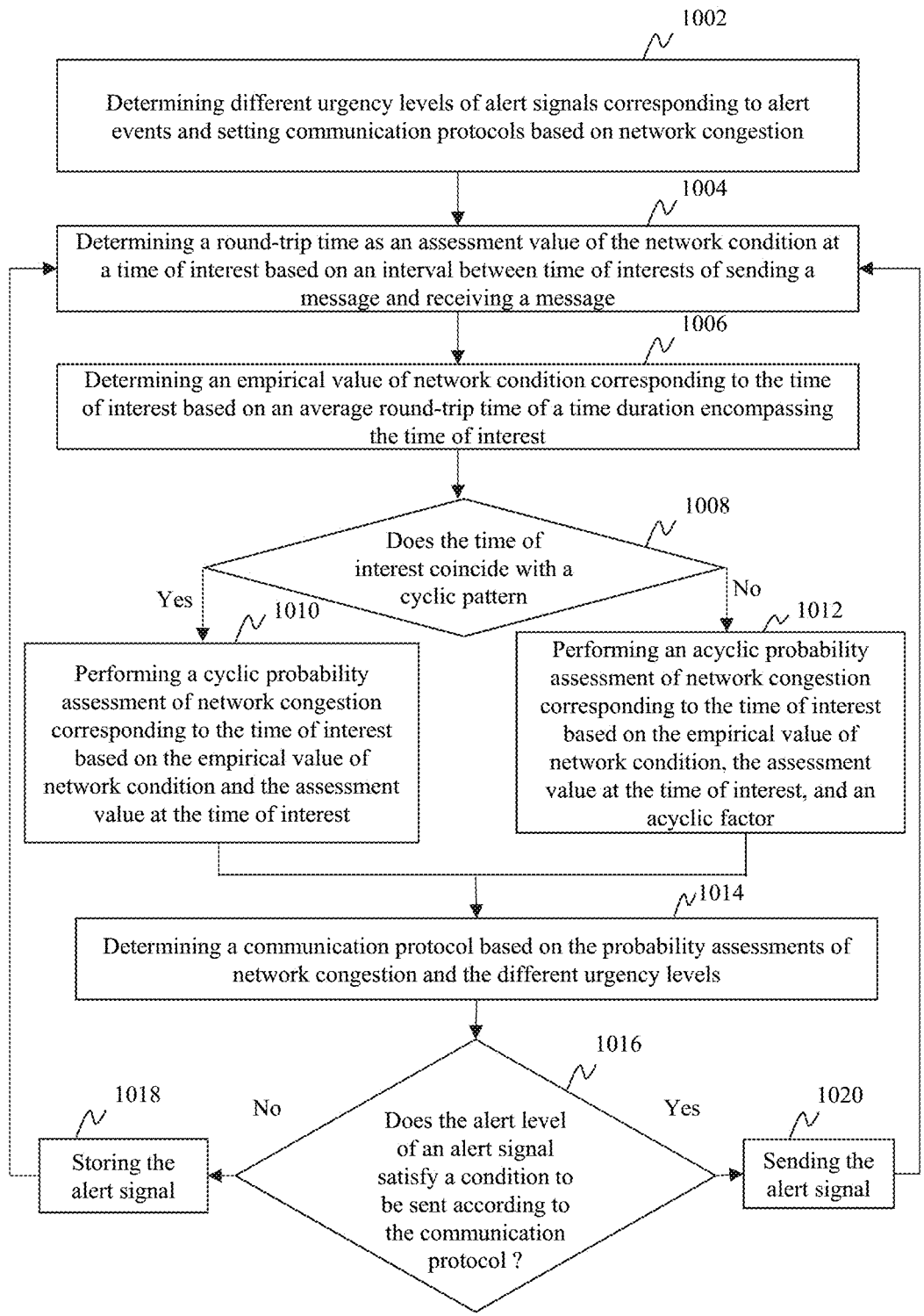
FIG. 10 is a flowchart illustrating an exemplary process for controlling network congestion and sending one or more alert signals according to some embodiments.

FIG. 10 is a flowchart of another exemplary process and/or method 1000 for controlling network congestion according to some embodiments of the present disclose. At least a portion of process 1000 may be implemented on the computing device 200 as illustrated in FIG. 2. In some embodiments, one or more operations of process 1000 may be implemented in Surveillance system 100 as illustrated in FIG. 1. In some embodiments, one or more steps in the process 1000 may be stored in storage device 140 and/or the storage (e.g., the ROM 206, the RAM 207, etc.) in the form of instructions, and invoked and/or executed by data processing device 120.

In 1002, different urgency levels of alert signals corresponding to alert events may be determined. The different urgency levels may be determined based on urgency levels of the alert events. The different urgency levels may include a low urgency level, a medium urgency level, a high urgency level, a super high urgency level, or the like, or any combination thereof. In some embodiments, communication protocols may be predetermined based on network congestion.

Merely by way of example, the communication protocol may include four portions, a first portion, a second portion, a third portion, and a fourth portion corresponding to four different network congestion levels. The network congestion levels may include, e.g., no congestion, light congestion, medium congestion, and heavy congestion. Detected alert events or the corresponding alert signals may be assigned four different urgency levels including, e.g., low urgency level, medium urgency level, high urgency level, and super high urgency level. The first portion may correspond to no network congestion at a time of interest (or referred to as a first time of interest). According to the first portion of the communication protocol, no limitation needs to be set for sending detected alert signal(s). The second portion may correspond to a light network congestion at the time of interest. According to the second portion of the communication protocol, the alert signal(s) above the low urgency level (e.g., including the alert signal(s) of a medium urgency level, a high urgency level, and/or a super high urgency level) may be allowed to be sent. The third portion may a medium network congestion at the time of interest. According to the third portion of the communication protocol, the alert signal(s) above the medium urgency level (e.g., including the alert signal(s) of a high urgency level and/or a super high urgency level) may be allowed to be sent. The fourth portion may correspond to a heavy network congestion at the time of interest. According to the fourth portion of the communication protocol, only the alert signal(s) of a super high urgency level may be allowed to be sent.

In 1004, an RTT at a time of interest may be determined. The RTT may refer to a time interval between sending a message and receiving confirmation of receipt of the message. The RTT may be set as an assessment value of the network condition.

In 1006, an empirical value of network condition corresponding to the time of interest may be determined based on an ARTT of a time duration encompassing the time of interest.

In 1008, whether the time of interest corresponds to a cyclic pattern may be determined. In response to a determination that the time of interest corresponds to the cyclic pattern, 1010 may be performed. In response to a determination that the time of interest dose not correspond to the cyclic pattern, 1012 may be performed.

In 1010, a cyclic CGA corresponding to the time of interest may be performed based on the empirical value of network condition and the assessment value at the time of interest. In 1012, an acyclic CGA corresponding to the time of interest may be performed based on the empirical value of network condition, the assessment value at the time of interest, and an acyclic factor.

In 1014, a communication protocol may be determined based on the probability assessments of network congestion and the different urgency levels. For example, when the value of CGA equals to 0.7, the network may be deemed to have light congestion and the second portion of the communication protocol may be applicable, and therefore the alert signal(s) above the low urgency level (e.g., including the alert signal(s) of the medium urgency, the high urgency level, and/or the super high urgency level) may be allowed to be sent.

In 1016, whether the urgency level of an alert signal satisfies a condition to be sent according to the communication protocol may be determined. In response to a determination that the urgency level of an alert signal dose not satisfy the condition to be sent, 1018 may be performed. In response to a determination that the urgency level of an alert signal satisfies the condition to be sent, 1020 may be performed.

In 1018, the alert signal that has not been sent may be stored. In some embodiments, the alert signal may be stored locally for sending until the network condition permits. In some embodiments, the network condition may be determined at a preset time interval until no more alert signal needs to be sent. In 1020, the alert signal may be sent via the network.

It should be noted that the above description regarding the process 1000 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations in process 1000 may be omitted or one or more additional operations may be added. For example, 1018 in which alert signals are stored, may be omitted.

EXAMPLES

The following example is provided for illustration purposes, and is not intended to limit the scope of the present disclosure.

Figure 11:
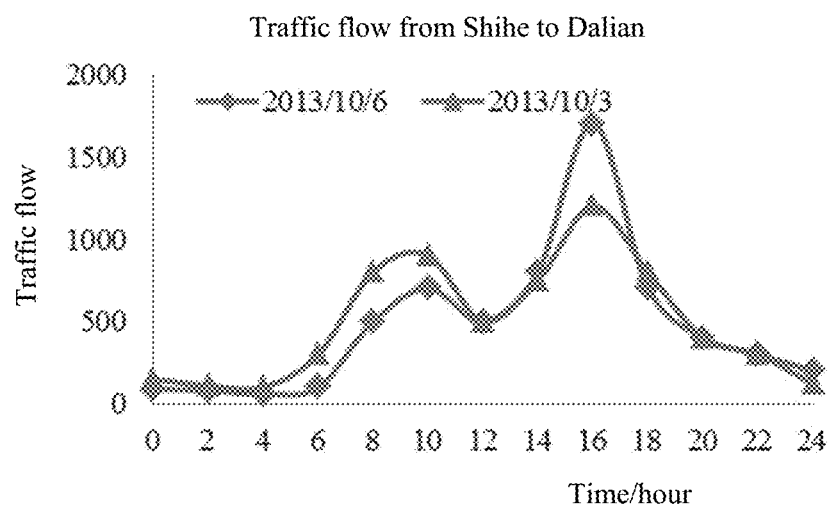
FIG. 11 illustrates an exemplary empirical network condition according to some embodiments of the present disclosure.

FIG. 11 illustrates an exemplary empirical network condition according to some embodiments of the present disclosure. As illustrated in FIG. 11, the traffic flow from Shihe to Dalian on Oct. 3, 2013 and that on Oct. 6, 2013 were similar. For example, the traffic flow at 16:00 PM was the largest on Oct. 3, 2013 and Oct. 6, 2013. The number of alert signals was also similar in a road monitoring network from Shihe to Dalian on Oct. 3, 2013 and Oct. 6, 2013. Accordingly, an empirical value of the network condition on Oct. 6, 2013 was similar to an empirical value of the network condition on October $3^{rd}$ of the same year. For example, the empirical value of the network condition at 16:00 on Oct. 6, 2013 may be determined based on an ARTT during 15:00 to 16:00 on Oct. 3, 2013. Assuming that 5 RTTs detected during 15:00 to 16:00 on Oct. 3, 2013, then the ARTT may be equal to an average of the 5 RTTs.

Having thus described the basic concepts, it may be rather apparent to those skilled in the art after reading this detailed disclosure that the foregoing detailed disclosure may be intended to be presented by way of example only and may be not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment may be included in at least one embodiment of the present disclosure. Therefore, it may be emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that may be not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, may be not intended to limit the claimed processes and methods to any order except as may be specified in the claims. Although the above disclosure discusses through various examples what may be currently considered to be a variety of useful embodiments of the disclosure, it may be to be understood that such detail may be solely for that purposes, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purposes of streamlining the disclosure aiding in the understanding of one or more of the various inventive embodiments. This method of disclosure, however, may be not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein may be hereby incorporated herein by this reference in its entirety for all purposes, excepting any prosecution file history associated with same, any of same that may be inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

We claim:

1. A method implemented on at least one machine each of which has at least one processor, storage, and a communication platform connected to a network, the method comprising:
    obtaining one or more alert signals corresponding to one or more alert events of one or more urgency levels at a first time of interest;
    obtaining a network condition of the network at the first time of interest;
    performing a congestion assessment (CGA) at the first time of interest based on the network condition;
    determining a network congestion level based on the CGA at the first time of interest;
    determining a first communication protocol corresponding to the network congestion level, the first communication protocol specifying an alert signal of which urgency level is allowed to be sent; and
    causing, based on the first communication protocol and the one or more urgency levels of the one or more alert signals, a first batch of alert signals of the one or more alert signals to be sent via the network.

2. The method of claim 1, wherein the network condition includes a round-trip time at the first time of interest, a shortest round-trip time of a first time duration that encompasses the first time of interest, and an empirical value of the network condition at the first time of interest.

3. The method of claim 2, further comprising:
    storing a second batch of alert signals of the one or more alert signals that have not been sent; and
    causing, based on a second communication protocol that is determined based on a CGA performed at a second time of interest, the second batch of the one or more alert signals to be sent via the network.

4. The method of claim 2, wherein the obtaining the network condition of the network at the first time of interest includes:
    determining whether the first time of interest corresponds to a cyclic pattern.

5. The method of claim 4, wherein the obtaining the network condition of the network at the first time of interest further includes:
    determining that the first time of interest corresponds to the cyclic pattern; and
    in response to a determination that the first time of interest corresponds to the cyclic pattern, obtaining the empirical value of the network condition at the first time of interest, the empirical value of the network condition including at least one average round-trip time of a second time duration encompassing the first time of interest.

6. The method of claim 5, wherein the performing the CGA at the first time of interest based on the network condition includes:
    determining the CGA based on the empirical value, the round-trip time at the first time of interest, and the shortest round-trip time of the first time duration.

7. The method of claim 5, further comprising:
    determining the average round-trip time of the second time duration based on a daily average round-trip time, a weekly average round-trip time, a monthly average round-trip time, or a yearly average round-trip time.

8. The method of claim 4, wherein the obtaining the network condition of the network at the first time of interest further includes:
    determining that the first time of interest fails to correspond to the cyclic pattern; and
    in response to a determination that the first time of interest fails to correspond to the cyclic pattern, obtaining the empirical value of the network condition at the first time of interest, the empirical value of the network condition including the at least one average round-trip time of a second time duration and an average round-trip time of a third time duration, both the second time duration and the third time duration encompassing the first time of interest.

9. The method of claim 8, wherein the performing the CGA at the first time of interest based on the network condition includes:
    determining the CGA based on the empirical value, the round-trip time at the first time of interest, and the shortest round-trip time of the first time duration.

10. The method of claim 4, wherein the cyclic pattern includes a predetermined time interval that includes a day, a week, a month, or a year.

11. A system, comprising:
    at least one computer-readable storage medium including a set of instructions;
    at least one processor in communication with the at least one computer-readable storage medium, wherein when executing the instructions, the at least one processor is directed to:
    obtain one or more alert signals corresponding to one or more alert events of one or more urgency levels at a first time of interest;
    obtain a network condition of the network at the first time of interest;

perform a congestion assessment (CGA) at the first time of interest based on the network condition;

determine a network congestion level based on the CGA at the first time of interest;

determine a first communication protocol corresponding to the network congestion level, the first communication protocol specifying an alert signal of which urgency level is allowed to be sent;

cause a first batch of alert signals of the one or more alert signals to be sent via the network based on the first communication protocol and the one or more urgency levels of the one or more alert signals.

12. The system of claim 11, wherein the network condition includes a round-trip time at the first time of interest, a shortest round-trip time of a first time duration that encompasses the first time of interest, and an empirical value of the network condition at the first time of interest.

13. The system of claim 12, wherein the at least one processor is further directed to:

store a second batch of alert signals of the one or more alert signals that have not been sent; and cause the second batch of the one or more alert signals to be sent via the network based on a second communication protocol that is determined based on a CGA performed at a second time of interest.

14. The system of claim 12, wherein to obtain the network condition of the network at the first time of interest, the at least one processor is directed to:

determine whether the first time of interest corresponds to a cyclic pattern.

15. The system of claim 14, wherein to obtain the network condition of the network at the first time of interest, the at least one processor is directed to:

determine that the first time of interest corresponds to the cyclic pattern; and in response to a determination that the first time of interest corresponds to the cyclic pattern, obtain the empirical value of the network condition at the first time of interest, the empirical value of the network condition including at least one average round-trip time of a second time duration encompassing the first time of interest.

16. The system of claim 15, wherein to perform the CGA at the first time of interest based on the network condition, the at least one processor is further directed to:

determine the CGA based on the empirical value, the round-trip time at the first time of interest, and the shortest round-trip time of the first time duration.

17. The system of claim 15, wherein the at least one processor is further directed to:

determine the average round-trip time of the second time duration based on a daily average round-trip time, a weekly average round-trip time, a monthly average round-trip time, or a yearly average round-trip time.

18. The system of claim 14, wherein to obtain the network condition of the network at the first time of interest, the at least one processor is directed to:

determine that the first time of interest fails to correspond to the cyclic pattern; and in response to a determination that the first time of interest fails to correspond to the cyclic pattern, obtain the empirical value of the network condition at the first time of interest, the empirical value of the network condition including the at least one average round-trip time of a second time duration and an average round-trip time of a third time duration, both the second time duration and the third time duration encompassing the first time of interest.

19. The system of claim 18, wherein to perform the CGA at the first time of interest based on the network condition, the at least one processor is directed to:

determine the CGA based on the empirical value, the round-trip time at the first time of interest, and the shortest round-trip time of the first time duration.

20. A non-transitory computer-readable storage medium storing instructions that, when executed by at least one processor of a system, cause the system to perform a method, the method comprising:

obtaining one or more alert signals corresponding to one or more alert events of one or more urgency levels at a first time of interest;

obtaining a network condition of the network at the first time of interest;

performing a congestion assessment (CGA) at the first time of interest based on the network condition;

determining a network congestion level based on the CGA at the first time of interest;

determining a first communication protocol corresponding to the network congestion level, the first communication protocol specifying an alert signal of which urgency level is allowed to be sent; and causing, based on the first communication protocol and the one or more urgency levels of the one or more alert signals, a first batch of alert signals of the one or more alert signals to be sent via the network.

* * * * *